(12) United States Patent
Minematsu

(10) Patent No.: US 6,249,763 B1
(45) Date of Patent: *Jun. 19, 2001

(54) SPEECH RECOGNITION APPARATUS AND METHOD

(75) Inventor: Ayako Minematsu, Yokohama (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,589

(22) Filed: Oct. 13, 1998

(30) Foreign Application Priority Data

Nov. 17, 1997 (JP) .................................... 9-315519
Sep. 8, 1998 (JP) .................................. 10-253449

(51) Int. Cl.⁷ ................................................ G10L 15/22
(52) U.S. Cl. ...................... 704/252; 704/257; 704/254
(58) Field of Search .................................. 704/252, 254, 704/256, 257, 255, 260

(56) References Cited

U.S. PATENT DOCUMENTS

| | | |
|---|---|---|
| 3,121,960 | 2/1964 | Uttal et al. . |
| 5,170,432 | 12/1992 | Hackbarth et al. ............... 381/43 |
| 5,195,167 | * 3/1993 | Bahl et al. ........................ 704/200 |
| 5,455,889 | * 10/1995 | Bahl et al. ........................ 704/236 |
| 5,503,560 | 4/1996 | Stentiford ......................... 434/167 |
| 5,682,501 | * 10/1997 | Sharman ........................... 704/260 |
| 5,766,015 | 6/1998 | Shpiro ............................... 434/156 |
| 5,774,841 | * 6/1998 | Salazar et al. .................... 704/225 |

FOREIGN PATENT DOCUMENTS

| | | |
|---|---|---|
| 44-7162 | 5/1962 | (JP) . |
| 60-123884 | 7/1985 | (JP) . |
| 61-18068 | 1/1986 | (JP) . |
| 62-111278 | 5/1987 | (JP) . |
| 62-299985 | 12/1987 | (JP) . |
| 3-75869 | 3/1991 | (JP) . |
| 3-226785 | 10/1991 | (JP) . |
| 4-54956 | 9/1992 | (JP) . |
| 6-12483 | 1/1994 | (JP) . |
| 6-27971 | 4/1994 | (JP) . |
| 8-12535 | 2/1996 | (JP) . |
| 8-50493 | 2/1996 | (JP) . |
| 9-22297 | 1/1997 | (JP) . |

OTHER PUBLICATIONS

J.J. Humphries et al., "Using Accent–Specific Pronunciation Modelling for Robust Speech Recognition," ICSLP '96, Philadelphia, PA, pp. 2324–2327, vol. 4, 1996.

U Jekosch et al., "Automatic Generation of Pronunciation Variants: Prospects for Speech Recognition and Speech Synthesis Systems," IT Informationstechnik, vol. 31, No. 6, pp. 400–406, Dec. 1989.

* cited by examiner

Primary Examiner—David R. Hudspeth
Assistant Examiner—Susan Wieland
(74) Attorney, Agent, or Firm—Paul J. Otterstedt

(57) ABSTRACT

A speech recognition apparatus and the method thereof for correctly recognizing an English word from a non-native English pronunciation, for example. A vector data generating part and a label generating part processes speech data of a sentence of English speech pronounced by a Japanese speaker to convert it to a label string. A candidate word generating part correlates the label string of the sentence to a first candidate word comprising one or more English words. An analogous word adding part uses a word database to search an English word analogous the pronunciation of the first candidate word, such as a analogous word "lead" for a first candidate word "read", for example, (it is difficult for a Japanese speaker to discriminate between "l" and "r" in pronunciation), and adds the obtained analogous word to the first candidate word to make it be a second candidate word. A selection part selects one of the second candidate words as a final result of recognition in response to users operation and connects the selected words into English text data for output.

14 Claims, 12 Drawing Sheets

FIG. 4

| INDEX TABLE | |
|---|---|
| POINTER TO A (LEADING ALPHABETS) | NUMBER OF WORD RECORDS IN EACH ALPHABET |
| ⋮ | ⋮ |
| POINTER TO Z | NUMBER OF WORD RECORDS IN EACH ALPHABET |

FIG. 5

| WORD RECORD | | | | | |
|---|---|---|---|---|---|
| TarWord | NextP | #Can | CanWord 1 | ⋯ | CanWord #Can |

FIG. 6

| ANALOGOUS WORD RECORD | | | | | | | | |
|---|---|---|---|---|---|---|---|---|
| #m | aWord 1 | ⋯ | aWord m-1 | #n | COWord 1 | ⋯ | COWord n | ECode |

FIG. 7

| ERROR INFORMATION CODE TABLE | |
|---|---|
| ECode | CONTENT |
| 0 | OK |
| 1 | PRONOUNCE R AS L |
| 2 | PRONOUNCE L AR R |
| ⋮ | ⋮ |
|  | PRONOUNCE TH AS S |
| ⋮ | ⋮ |

FIG. 8

| INPUT RECORD InWord (i j) | | |
|---|---|---|
| i | j | InWord | i: i-th WORD OF SENTENCE
j: j-th CANDIDATE

InWord: INPUT WORD INFORMATION
  -WORD
  -LENGTH OF WORD
  -PROBABILITY DATA

FIG. 9

| INPUT RECORD MATRIX | | InMatrix | | |
|---|---|---|---|---|
| Maxi | Maxj | Flg(1 1) | ... | Flg(i j) |

Maxi:  MAXIMUM NUMBER OF WORDS IN SENTENCE
Maxj:  MAXIMUM NUMBER OF CANDIDATES FOR SAME SOUND
Flg(i j): FLAG INDICATING WHETHER OR NOT j-th CANDIDATE EXISTS IN i-th WORD

FIG. 10

| OUTPUT WORD RECORD | | |
|---|---|---|
| i' | j' | OutWord | i': i-th WORD OF SENTENCE
j': j-th CANDIDATE

OutWord: OUTPUT WORD INFORMATION
  -WORD
  -LENGTH OF WORD
  -PROBABILITY DATA
  -ERROR INFORMATION FOR INPUT WORD
   (INFORMATION ADDED TO InWord)

FIG. 11

| OUTPUT RECORD MATRIX | | OutMatrix | | |
|---|---|---|---|---|
| Maxi' | Maxj' | Flg(1 1) | ... | Flg(i' j') |

(SAME FORMAT AS INPUT RECORD MATRIX)

FIG. 16

PLEASE PRONOUNCE "READ"

FIG. 17

(A) CCode 1

| | | |
|---|---|---|
| ENTRY 1 | POINT TO BE CORRECTED (TEXT) | FIG. 19(a) |
| ENTRY 2 | SHAPE OF MOUTH FOR R (IMAGE) | FIG. 19(b) |
| ENTRY 3 | SHAPE OF MOUTH FOR L (IMAGE) | FIG. 19(c) |
| ENTRY 4 | ADVICE FOR PRONOUNCING R (TEXT) | FIG. 19(d) |
| ENTRY 5 | EXAMPLE OF WORD OF R (TEXT) | OMITTED IN FIG. 19 |
| ENTRY 6 | EXAMPLE OF WORD OF L (TEXT) | (FIG. 21, FIG. 22) |
| ENTRY 7 | COMBINATION OF WORDS R,L (TEXT) | |
| ENTRY 8 | EXAMPLE OF SENTENCE INCL. R,L (TEXT) | |
| | REPEAT PRONUNCIATION (TEXT) | FIG. 19(e) (FIG. 23) |

(B) CCode 2

| | |
|---|---|
| ENTRY 1 | POINT TO BE CORRECTED (TEXT) |
| ENTRY 2 | SHAPE OF MOUTH FOR L (IMAGE) |
| ENTRY 3 | SHAPE OF MOUTH FOR R (IMAGE) |
| ENTRY 4 | ADVICE FOR PRONOUNCING L (TEXT) |
| ENTRY 5 | EXAMPLE OF WORD OF L (TEXT) |
| ENTRY 6 | EXAMPLE OF WORD OF R (TEXT) |
| ENTRY 7 | COMBINATION OF WORDS R,L (TEXT) |
| ENTRY 8 | EXAMPLE OF SENTENCE INCL. R,L (TEXT) |
| | REPEAT PRONUNCIATION (TEXT) |

FIG. 18

| ANALOGOUS WORD RECORD | | | | | | | | |
|---|---|---|---|---|---|---|---|---|
| #m | aWord 1 | ... | aWord m-1 | #n | COWord 1 | ... | COWord n | CCode |

FIG. 21

"READ" IS NOW PRONOUNCED CORRECTLY
TRY TO PRONOUNCE THE FOLLOWING WORDS
TO SEE YOU CERTAINLY UNDERSTAND "R" PRONUNCIATION

WRITE    RAW    (ENTRY 5)
LONG    LIGHT    (ENTRY 6)

FIG. 22

THIS IS A BIT ADVANCED COURSE
PRONOUNCE THE FOLLOWING WORDS
BY CAREFULLY DISTINGUISHING BETWEEN "R" AND "L"

WRITE LETTERS    GREAT TROUBLE    (ENTRY 7)

FIG. 23

THIS IS A CHECK FOR FINISHING
PLEASE READ THE FOLLOWING SENTENCE

THE RIVER ROSE SEVERAL FEET AND FINALLY OVERFLOWED ITS BANKS.
(ENTRY 8)

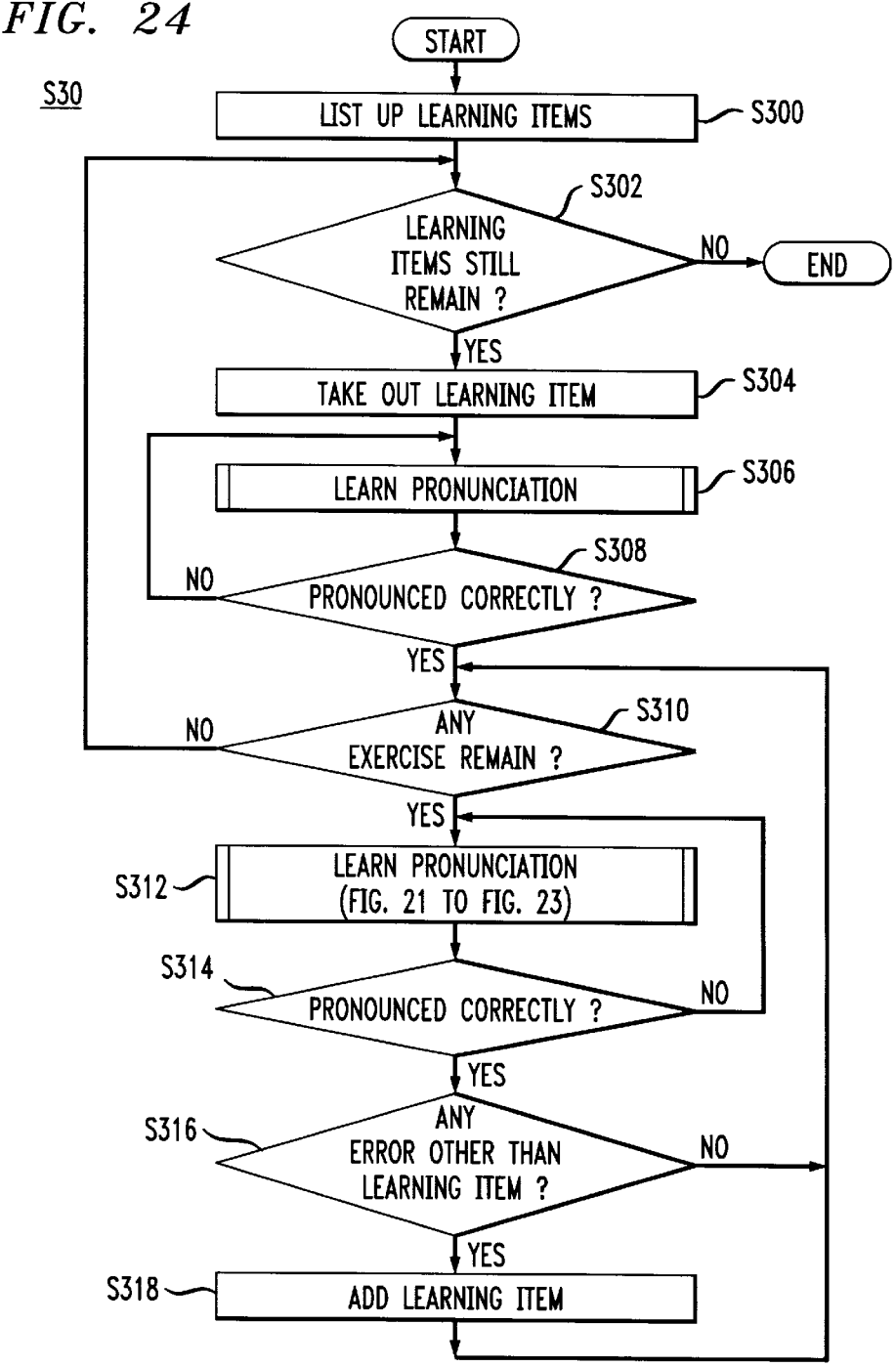

SPEECH RECOGNITION APPARATUS AND METHOD

FIELD OF THE INVENTION

This invention relates to a speech recognition apparatus and a method thereof for recognizing words of a specific foreign language contained in a speech spoken by a speaker who has a specific native language, for example, a speech recognition apparatus and a method thereof for recognizing an English speech spoken by a Japanese speaker to output data (text data) indicating a string of English words contained in the speech.

This invention also relates to a pronunciation correcting apparatus and method for teaching a correct pronunciation to a speaker to correct the pronunciation utilizing data (candidate word data) obtained in said speech recognition apparatus and in the course of practicing said method.

BACKGROUND OF THE INVENTION

A speech recognition apparatus has been so far used for recognizing words contained in a speech spoken by an unspecified speaker to output the words as text data.

PUPA 06-12483, PUPA 08-50493 and PUPA 09-22297 (references 1–3), for example, disclose such speech recognition methods.

For example, when English text data is generated from an English speech spoken by a Japanese speaker by an English speech recognition apparatus for recognizing English words from an English speech using a conventional speech recognition method, the recognition rate is low. This is because English language contains a sound which does not exist in Japanese language (th, etc.) or a sound which is difficult to be discriminated in Japanese language (l, r, etc.) and Japanese speaker are not generally capable of pronouncing such English sound correctly so that the English speech recognition apparatus translates an incorrect pronunciation into a word as it is. For example, even when a Japanese speaker intends to pronounce "rice" in English, the English speech recognition apparatus may recognize this pronunciation as "lice" or "louse".

Such inexpediences may occur in various situations such as when an American whose native language is English uses a speech recognition apparatus for generating a Japanese text from a speech in Japanese contrary to the above, when a British speaker whose native language is British English uses a speech recognition apparatus tuned for American English, or when a particular person has a difficulty to pronounce correctly by some reason.

The speech recognition apparatus disclosed in the above references, however, are unable to solve such inexpediences.

If English pronunciation of the speaker is improved approaching a pronunciation of a native speaker, the recognition rate of the speech recognition apparatus is naturally improved and it is in fact desirable for a speaker to improve English conversation.

For example, PEPA4-54956 discloses a learning apparatus for recognizing English speech of a speaker and causes the speaker to affirm the recognized English speech (reference 4).

Also, PUPA60-123884, for example discloses an English learning machine for letting the speaker listen to a speech to learn by using a speech synthesizer LSI (reference 5).

A learning apparatus for learning pronunciation of foreign language is disclosed in many other publications including PEPA44-7162, PEPA H7-117807, PUPA61-18068, PEP H8-27588, PUPA62-111278, PUPA62-299985, PUPA3-75869, PEPA6-27971, PEPA8-12535, and PUPA3-226785 (references 6 to 14).

However, the speaker can not necessarily attain a sufficient learning effect using the learning apparatuses disclosed in these references because the speaker has to compare his or her own pronunciation with a presented pronunciation or he or she fails to find which part of his or her pronunciation is wrong.

SUMMARY OF THE INVENTION

This invention is conceived in view of the above described problems of the conventional technology and aims at providing a speech recognition apparatus and a method thereof for recognizing words contained in a speech of a predetermined language spoken by a speaker whose native language is other than the predetermined language (non native) and translating the words into the words of the predetermined language intended by the speaker to generate correct text data.

It is also an object of this invention to provide a speech recognition apparatus and a method thereof for translating a speech spoken by a speaker in any region into a word intended by the speaker to enable correct text data to be generated even when pronunciation of a same language varies due to the difference of the regions where the language is spoken.

It is also an object of this invention to provide a speech recognition apparatus and a method thereof which compensates for the difference of pronunciation by individuals to maintain a consistently high recognition rate.

It is another object of this invention to provide a pronunciation correcting apparatus and method for pointing out a problem of a speaker's pronunciation, and letting the speaker learn a native speaker's pronunciation to correct the speaker's pronunciation by utilizing data obtained from said speech recognition apparatus and in the course of practicing said method.

It is still another object of this invention to provide a speech correcting apparatus and method for correcting pronunciation which is capable of automatically comparing speaker's pronunciation with a correct pronunciation to point out an error and presenting detailed information indicating how the speaker should correct the pronunciation.

In order to achieve the above objectives, this invention provides a first speech recognition apparatus for recognizing words from speech data representing one or more words contained in a speech comprising; candidate word correlating means for correlating each of one or more of said speech data items of words to one or more sets of candidates (candidate words) comprising a combination of one or more of said words obtained by recognizing each of one or more of said speech data items, analogous word correlating means for correlating each of said candidate words correlated to each of one or more of the speech data items of said words to null or more sets of a combination of one or more of said words (analogous words) which may correspond to pronunciation of each of said candidate words, and speech data recognition means for selecting either said candidate word correlated to each of one or more of said speech data items of words or said analogous word correlated to each of said candidate word as a recognition result of each of said speech data items of words.

Preferably, said speech data represents one or more words contained in a speech of a predetermined language, said candidate correlating means correlates each of one or more speech data items of said words to one or more sets of candidate words of said predetermined language obtained by recognizing each of the one or more speech data items, said analogous word correlating means correlates each of said candidate words correlated to each of the one or more speech data items of said words to null or more sets of analogous words of said predetermined language which may correspond to the pronunciation of each of said candidate words, and said speech data recognition means selects either said candidate word correlated to each of one or more of said speech data items of words or said analogous word correlated to each of said candidate word as a recognition result of each of one or more of speech data items of said words.

Preferably, the speech of said predetermined language is pronounced by a speaker who mainly speaks a language other than said predetermined language, the speech recognition apparatus is provided with analogous word storage means for storing null or more sets of words of said predetermined language which may correspond to each of one or more speech data items of the words contained in the speech of said predetermined language in correlation to each of one or more words of said predetermined language as said analogous word of each of one or more words of said predetermined language when each of one or more words of said predetermined language is pronounced by said speaker, and said analogous word storage means correlates null or more of said analogous words which were stored beforehand in correlation to each of one or more words of said predetermined language to each of said candidate words.

Preferably, said candidate word correlating means associates each of said candidate words correlated to the speech data with probability data indicating a likelihood of each of said candidate word correlated to the speech data, and said speech data recognition means selects only said candidate word having a value of said probability data within a predetermined range as the result of the recognition of the speech data of said words.

Preferably, said candidate word correlating means associates each of said candidate words correlated to the speech data with error information indicating an error of pronunciation corresponding to each of said candidate words.

The speech recognition apparatus of this invention recognizes a word contained in an English speech (voice) pronounced by a speaker (a Japanese speaker, for example) whose native language (Japanese language, for example) is other than a predetermined language (English language, for example) and who mainly speaks the native language and translates it to an English word to generate text data.

In the speech recognition apparatus of this invention, an English speech (speech data) spoken by a Japanese speaker, inputted from a microphone, etc., and converted to digital data is converted to quantized vector data according to features of the sound (loudness, intensity and intonation, etc., of the sound) and further converted to sound data which is analogous to a phonetic symbol and called a label for output to the candidate word correlating means.

The candidate word correlating means processes the speech data converted to a label word by word or by a series of a plurality of words and correlates the speech data to a single English word or a combination of a plurality of English words (collectively called a candidate word) as a candidate of the result of recognizing the speech data.

The analogous word storage means stores dictionary data for retrieval, for example, in which a single English word or a combination of a plurality of English words which may correspond to speech data (collectively called analogous word) when a Japanese speaker pronounces English language though not a correct English pronunciation is or are beforehand correlated to a single English word or a combination of a plurality of English words which can be a candidate word.

For example, in order to deal with an inaccurate English pronunciation by a Japanese speaker, a single English word "lead" which may be a candidate word is correlated to an analogous word "read" (in consideration of "l" and "r" which are difficult for Japanese speakers to discriminate, and since Japanese speaker generally can not correctly pronounce "r") in the dictionary data. Occasionally, there is no analogous word to an English word. In such case, an analogous word is not correlated to an English word.

The analogous word correlating means searches the dictionary data stored in the analogous word storage means to read out an analogous word correlated to a candidate word and correlates the analogous word to the candidate word. In the above example, speech data corresponding to an English word "read" pronounced by a Japanese speaker is correlated to an English word "lead" and an analogous word "read".

The speech recognition means selects either a candidate word correlated to speech data or an analogous word as a result of recognition based on a syntactic parsing of a string of English words so far recognized or in response to a selection by a user, for example.

The components of the speech recognition apparatus of this invention processes speech data inputted one after another in the manner as described in the above to recognize English words contained in the speech data and generates text data concatenating the recognized English words.

While an English speech by a Japanese speaker has been so far described as an example, the speech recognition apparatus of this invention can recognize both an English speech in a British pronunciation and one in an American pronunciation to generate text data by modifying the analogous word storage means such that it stores dictionary data which correlates an analogous word which may correspond to speech data to a candidate word when the speech is pronounced in a British English pronunciation which is different from an American English pronunciation.

In this way, the scope of the above "predetermined language" is defined as a scope in which speech data can be correlated to a word with a sufficient recognition rate. Therefore, dialects (English languages in the US, England, Australia, and South Africa, etc., and Spanish languages in Spain and south American countries, for example) for which a sufficient recognition rate is not obtained only by a candidate word correlating means adjusted for one of the dialects are not included in a same scope of said "predetermined language" even if they are normally said to be a same language because they are pronounced differently due to a geographical separation. The same is true when the pronunciation of a particular person becomes obscure by some reason or when a sufficient recognition rate is not obtained only with a candidate word correlating means which is adjusted to the native language (the language mainly spoken).

The second speech recognition apparatus of this invention recognizes one or more words of said predetermined language from speech data representing one or more words of said predetermined language contained in a speech of said predetermined language spoken by a speaker who mainly speaks a language other than the predetermined language, and comprises word correlating means for correlating each of one or more speech data items of words of said predetermined language to a word of said predetermined language obtained by recognizing each of the one or more speech data items and/or one or more words of said predetermined language which are possibly spoken by said speaker, and speech data recognition means for selecting one of words each correlated to each of one or more speech data items of said words as a result of recognition of each of one or more speech data items of said words.

The first speech recognition method of this invention recognizes words from speech data representing one or more words contained in a speech and comprises the steps of, correlating each of one or more of said speech data items of words to one or more sets of candidates (candidate words) comprising a combination of one or more of said words obtained by recognizing each of one or more of said speech data items, correlating each of said candidate words correlated to each of one or more of the speech data items of said words to null or more sets of a combination of one or more of said words (analogous words) which may correspond to pronunciation of each of said candidate words, and selecting either said candidate word correlated to each of on or more of said speech data items of words or said analogous word correlated to each of said candidate word as a recognition result of each of said speech data items of words.

The second speech recognition method of this invention recognizes one or more words of said predetermined language contained in a speech of said predetermined language spoken by a speaker who mainly speaks a language other than the predetermined language, and comprises the steps of, correlating each of one or more speech data items of words of said predetermined language to a word of said predetermined language obtained by recognizing each of the one or more speech data items and/or one or more words of said predetermined language which are possibly spoken by said speaker, and selecting one of words each correlated to each of one or more speech data items of said words as a result of recognition of each of one or more speech data items of said words.

The speech correcting apparatus of this invention comprises, candidate word correlating means for correlating each of one or more of said speech data items of words to one or more candidates of words (candidate words) obtained by recognizing said speech data items indicating the words, analogous word correlating means for correlating each of said candidate words correlated to the speech data items to null or more words (analogous words) which may correspond to pronunciation of each of said candidate words, and pronunciation correcting data output means for outputting pronunciation correcting data corresponding to the same analogous word indicated by said speech data item and correcting the pronunciation of the word indicated by said speech data item when the word indicated by said speech data item matches said analogous word correlated to each of said candidate words which are correlated to said speech data item.

In the speech correcting apparatus of this invention, the candidate word correlating means and analogous word correlating means correlate the speech data items to the candidate words and the analogous words in the manner similar to the speech recognition apparatus of this invention described in the above.

When the speaker pronounces as correct as a native speaker, the word intended by the speaker and the result of recognizing the speech data will be included in the candidate word. On the other hand, if the speaker's pronunciation is wrong or obscure, the result of recognizing the speech data item is included in the analogous word though the word intended by the speaker is included in the candidate word. Therefore, when a speaker is given a word to pronounce and pronounces that word, and if that word matches an analogous word as a result of recognizing the speech data item, it is meant that the pronunciation by a user (speaker) contains some error or the pronunciation is obscure.

When the word given to the speaker matches an analogous word, the speech correcting data output means displays information correcting the error or obscurity of the pronunciation (for example, image data showing the movement of mouth and tongue of a native speaker in pronouncing correctly, and text data showing a sentence telling which part of speaker's pronunciation is wrong when compared to a native speaker) in a monitor, prompting the speaker to correct the pronunciation and assisting the learning so that the speaker's pronunciation approaches a native speaker's pronunciation.

The speech correcting method of this invention comprises the steps of, correlating each of one or more of said speech data items of words to one or more candidates of words (candidate words) obtained by recognizing said speech data items indicating the words, correlating each of said candidate words correlated to the speech data items to null or more words (analogous words) which may correspond to pronunciation of each of said candidate words, and outputting pronunciation correcting data corresponding to the same analogous word indicated by said speech data item and correcting the pronunciation of the word indicated by said speech data item when the word indicated by said speech data item matches said analogous word correlated to each of said candidate words which are correlated to said speech data item.

BRIEF DESCRIPTION OF THE DRAWING

FIG. 4 shows an example of data contained in the index table of word data.

FIG. 5 shows an example of data contained in the word record of word data.

FIG. 6 shows an example of data contained in the analogous word record of word data.

FIG. 7 shows an example of an error information code table of word data.

FIG. 8 shows a data structure of the input record (InWord) which the candidate word generating part outputs to the analogous word adding part.

FIG. 9 shows a data structure of the input record matrix (InMtrix) which the candidate word generating part outputs to the analogous word adding part.

FIG. 10 shows the data structure of an output record (OutWord) which the analogous word adding part outputs to the selection part.

FIG. 11 shows the data structure of an output record matrix (OutMatrix) which the analogous word adding part outputs to the selection part.

FIG. 16 is a diagram showing an example of the pronunciation prompting image which the control part shown in FIG. 15 displays.

FIG. 17 (A), (B) are diagrams showing an example of correcting information index generated by the word database part shown in FIG. 15 in which (A) shows a pronunciation correcting image for correcting pronunciation of "r" and (B) shows a pronunciation correcting image for correcting pronunciation of "l".

FIG. 18 is a diagram showing an analogous word record generated by the word database part in the second embodiment of this invention.

FIGS. 21 is a diagram showing an example of the second pronunciation correcting image used in the pronunciation learning method shown as the second embodiment.

FIGS. 22 is a diagrams showing an example of the third pronunciation correcting image used in the pronunciation learning method shown as the third embodiment.

FIGS. 23 is a diagrams showing an example of the fourth pronunciation correcting image used in the pronunciation learning method shown as the fourth embodiment.

FIG. 24 is a flow chart showing the operation (S30) of speech recognition/correction program 22 (FIG. 15) in the third embodiment.

FIG. 25 is a diagram showing an example of a learning item list generated in the list up process (S300) of the learning items shown in FIG. 24.

DETAILED DESCRIPTION OF A PREFERRED EMBODIMENT OF THE INVENTION

The mode of practicing this invention is now described hereunder.

For the convenience and clarification of the description, the speech recognition apparatus of this invention is described for a specific example where the apparatus is adjusted for recognizing English spoken by a Japanese speaker unless it is specifically mentioned otherwise.
Computer 1

A computer 1 implementing the speech recognition apparatus of this invention is described with reference to FIG. 1.

Figure 1:
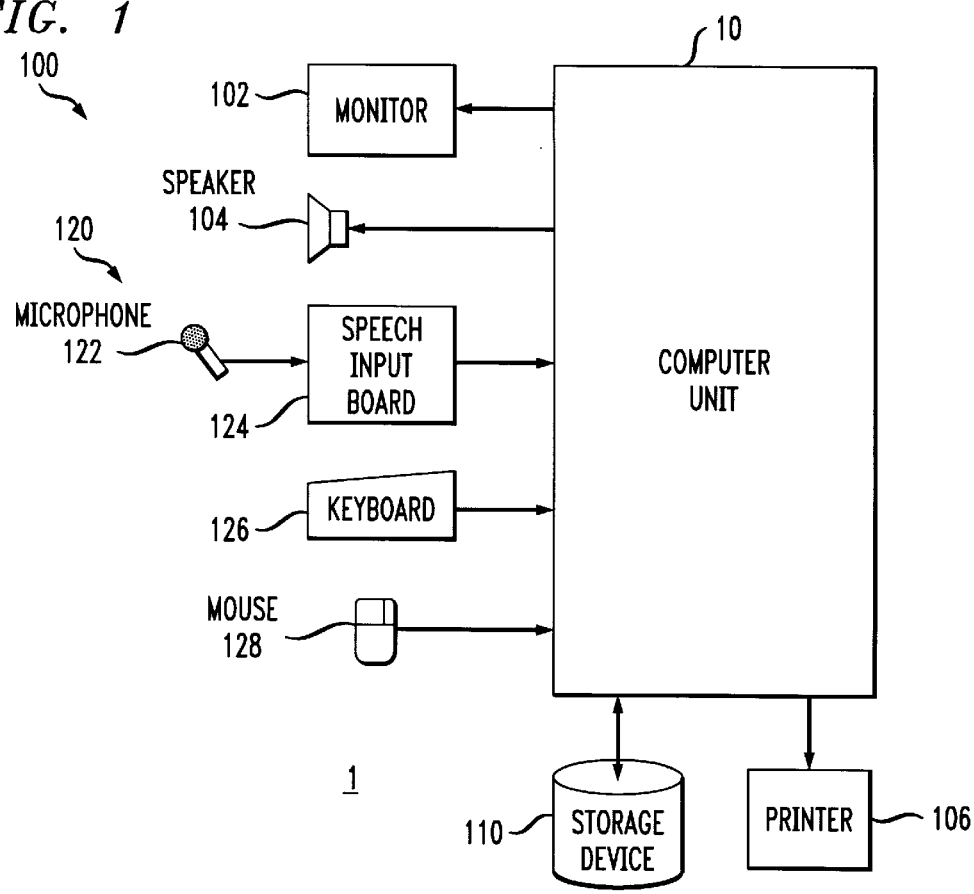
FIG. 1 is a diagram showing an example of a configuration of the computer implementing the speech recognition apparatus of this invention.

As shown in FIG. 1, the computer 1 is, for example, a personal computer having a speech input/output function and comprises a computer unit 10 including a CPU, a memory and peripheral devices therefor, an output device 100, a storage device 110 including a magnetic-optical (mo) disk device, a hard disk device or a floppy disk device, and an input device 120.

The output device 100 includes a monitor 102 such as a CR display device, a speaker 104 for voice output and a printer 106, etc.

The input device 120 includes a microphone 122, a speech input board 124, a keyboard 126 and a mouse 128.
Monitor 102

The monitor 102 displays a GUI image for operation and text data which the computer unit 10 obtained by recognizing the speech to a user in the output device 100.
Speaker 104

The speaker 104 is used for outputting text data which the computer unit 10 obtained by recognizing the speech as a speech, for example.
Printer 106

The printer is used for outputting a hard copy of text data which the computer unit 10 obtained by recognizing the speech, for example.
Storage Device 110

The storage device 110 operates under the control of the computer unit 10 and stores text data which the computer unit 10 obtained by recognizing the speech.

The storage device 110 also stores data necessary for speech recognition (such data is collectively called "word data") and a program, and outputs the stored word data and the stored program to the computer unit 10.

The word data stored in the storage device 110 is prepared by a speech recognition program 16 or supplied by a recording medium such as a floppy disk, for example, and includes a label string table, an index table, a word record, an analogous word record and an error information code table (details thereof will be described later with reference to FIG. 4 to FIG. 7, excluding the label string table).
Microphone 122

The microphone 122 collects a voice of a speech pronounced by a user and converts it to a voice signal in an analog form for output to the speech input board 124.
Speech Input Board 124

The speech input board 124 operates according to the control by the computer unit 10 and samples a speech signal inputted from the microphone 122, converts it to voice data in a digital form corresponding to the waveform of the speech signal and outputs it to the computer unit 10.
Keyboard 126, Mouse 128

The keyboard 126 and the mouse 128 receive an operation by a user on the GUI displayed on the monitor 102 and outputs it to the computer unit 10 as an operational input.
Software 14

The configuration of the software implementing the speech recognition processing of this invention is now described with reference to FIG. 2.

Figure 2:
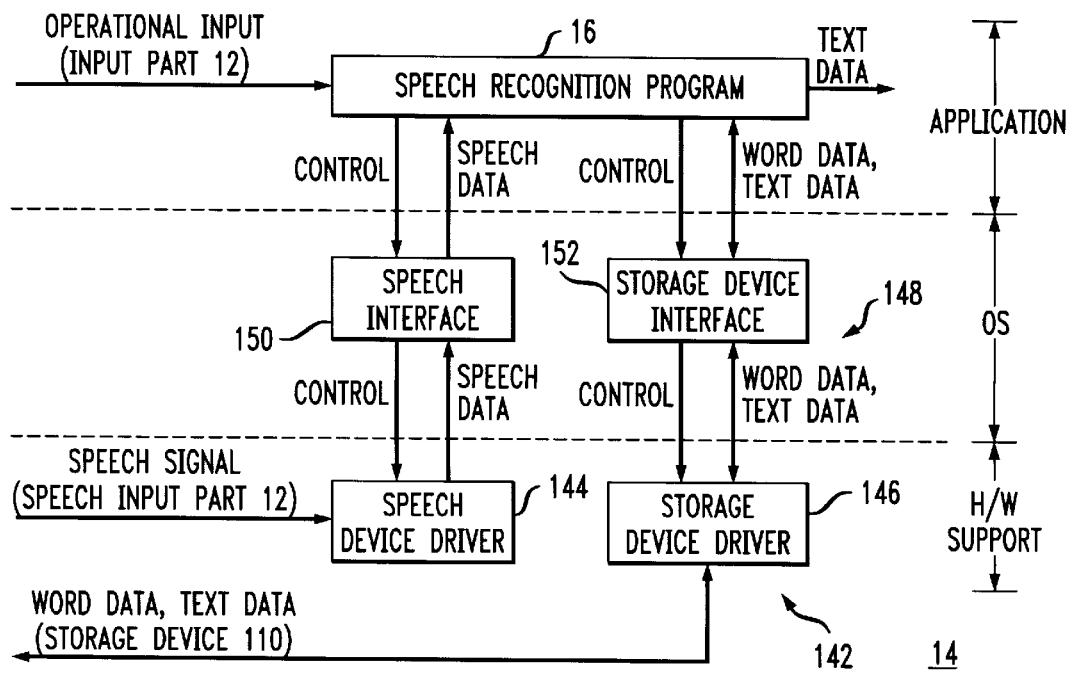
FIG. 2 is a diagram showing the configuration of the software implementing the speech recognition processing of this invention.

FIG. 2 is a diagram showing the configuration of the software 14 implementing the speech recognition processing of this invention. In FIG. 2, those components of the software which are not relevant to implementation of the speech recognition processing are omitted.

As shown in FIG. 2, the software 14 comprises a hardware (H/W) support part 142, an operating system (OS) 148 and an application part.

The hardware support part 142 includes a speech device driver 144 and a storage device driver 146.

The operating system 148 is a general purpose OS such as OS/2 (trademark of IBM) or Windows (trademark of Microsoft) and includes a speech interface (IF) part 150 and a storage device interface part 152.

The software 14 includes a speech recognition program 16 as an application part.

These components of the software 14 are stored in the storage device 110 and loaded into a memory of the computer unit 10 as required for execution.
Speech Device Driver 144

The speech device driver 144 controls the speech input board 124 to have it convert a speech signal inputted from the microphone to speech data in the hardware support part 142.

The speech device driver 144 also implements an interface function to output speech data inputted from the speech input board 124 to the speech interface part 150.

The speech device driver 144 also controls operations such as changing setting of a sampling period of the speech input board 124, and the start and the end of sampling according to the control by the speech interface part 150 of the operating system, 148.

Storage Device Driver 146

The storage device driver 146 controls the operation of the storage device 110 in response to a request (control) from a storage device interface part 152 of the operating system 148 to have it store word data and text data obtained as a result of the speech recognition or read out these data stored in the storage device 110.

The storage device driver 146 also implements an interface function to output word data and text data inputted from the storage device 110 to the storage device interface part 152 or output the data inputted from the storage device interface part 152 to the storage device driver 146.

Operating System 148

The operating system 148 controls a function which is implemented by the speech interface part 150 and the storage device interface part 152 as well as execution of a program in the computer unit 10.

The operating system 148 also performs a process of displaying text data outputted from the speech recognition program 16 and the GUI image on the monitor 12, a process of converting the text data to a speech signal for output via the speaker 104, a process required for printing a hard copy in the printer 106, and a process of receiving users operation on the keyboard 126 and the mouse 128.

Speech Interface Part 150

The speech interface part 150 controls the speech device driver 144 in response to a request (control) from the speech recognition program 16 in the operating system 148.

The speech interface part 150 also implements an interface function to output speech data inputted from the speech device driver 144 to the speech recognition program 16.

Storage Device Interface Part 152

The storage device interface part 152 controls a storage area of the storage device 110.

The storage device interface part 152 also controls the storage device driver 146 in response to a request (control) from the speech recognition program 16 to have it read out word data and text data requested from the speech recognition program 16 and output the read out word data and text data to the speech recognition program 16.

The storage device interface part 152 also have the word data and text data inputted from the speech recognition program 16 to be stored in a free storage area of the storage device 110 via the storage device driver 146.

Speech Recognition program 16

Figure 3:
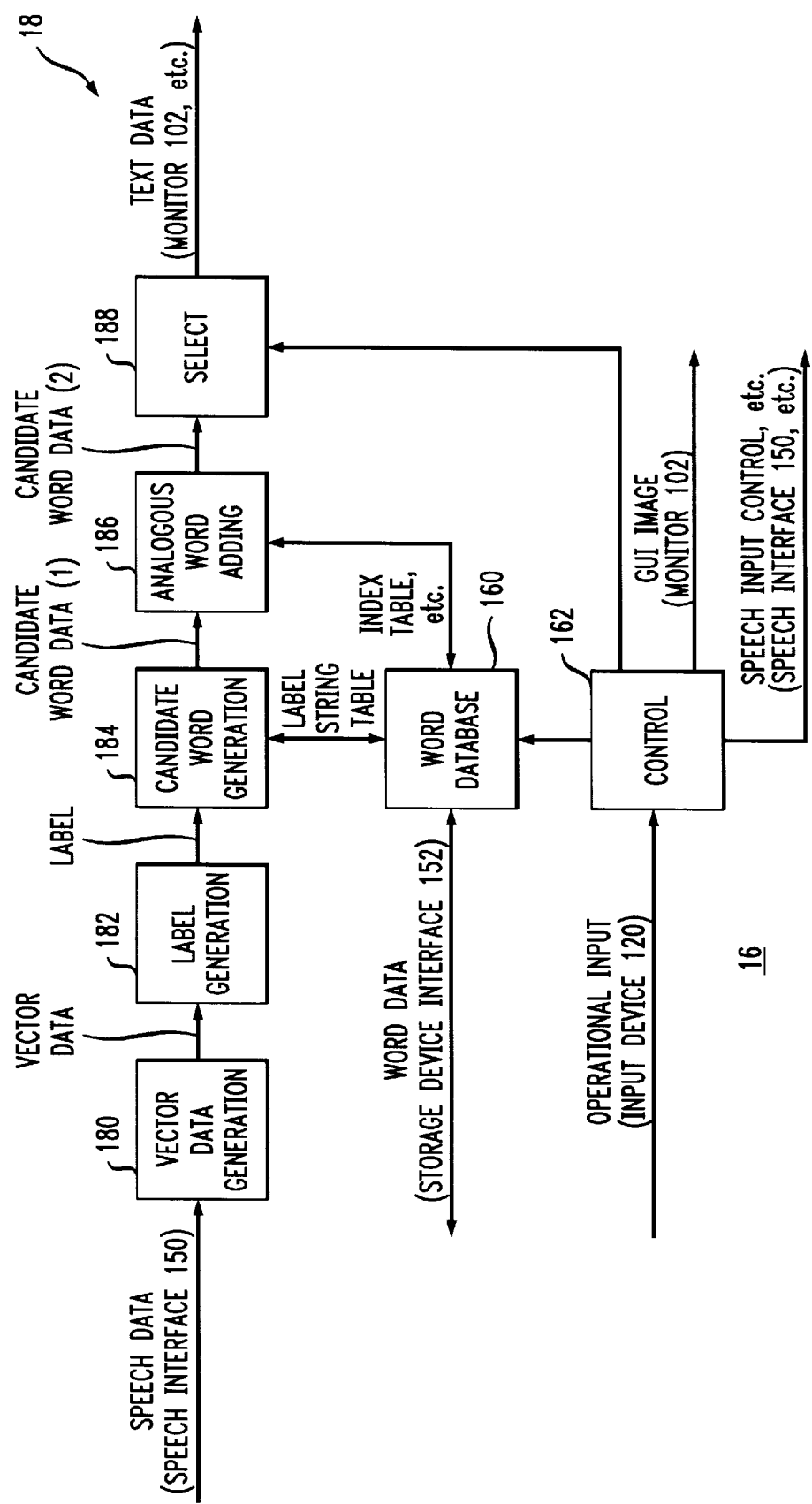
FIG. 3 is a diagram showing a configuration of the speech recognition program shown in FIG. 2.

The speech recognition program 16 is now described hereunder with reference to FIG. 3.

FIG. 3 is a diagram showing a configuration of the speech recognition program 16 shown in FIG. 2.

As shown in FIG. 3, the speech recognition program 16 comprises a word database 160, a control part 162 and a speech recognition part 18.

The speech recognition part 18 comprises a vector generating part 180, a label generating part 182, a candidate word generating part 184, an analogous word adding part 186 and a selection part 188.

With these components, the speech recognition program 16 displays a GUI image for operation, recognizes speech data inputted from the speech interface part 150 using word data inputted from the storage device interface 152 according to users operation on the displayed GUI image, and outputs a word string obtained as a result of the recognition as text data via the operating system 148.

Control Part 162

The control part 162 displays a GUI image for operation on the monitor 102 and receives an operation which a user operates on the displayed GUI image using the keyboard 126 and the mouse 128 of the input device 120.

The control part 162 also controls the speech interface part 150 and the storage device interface 152 of the operating system 148 in response to the received operational input.

The control part 162 also controls the word database 160 in response to the received operational input and generates or updates word data including; a label string table which is used by the candidate word generating part 184 to correlate speech data to a candidate word, an index table which is used by the analogous word adding part 186 to correlate an analogous word to a candidate word, a word record, an analogous word record and an error information code table (to be described later with reference to FIG. 4 to FIG. 7), for storage in the storage device 110 via the storage device interface part 152, etc.

The control part 162 also displays a candidate word and an analogous word correlated to portions of the speech data and causes the selection part 188 to select one of the candidate word and the analogous word in response to an operational input to the displayed words to make it be a final result of the recognition.

An example of a method of displaying a candidate word and an analogous word may include a method in which a candidate word correlated by the candidate word generating part 184 and the analogous word adding part 186 is displayed in inverted form on the monitor 102 and the candidate word and the analogous word are successively displayed in response to users operation on the keyboard 126, or the user finds and clicks a wrong candidate word displayed on the monitor 102 to display a list of candidate words and analogous words in a window correlated to the candidate word of the clicked portion.

Word Database Part 160

The word database part 160 generates or updates word data according to the control by the control part 162 as described in the above to have it stored in the storage device 110 for control purpose.

The word database 160 also outputs word data (label string table) to the candidate word generating part 184.

The word database 160 searches word data (index table, word record, analogous word record and error information code table, FIG. 4 to FIG. 7) in response to a request from the analogous word adding part 186 and outputs a word record, an analogous word record and error information which are obtained as a result of the search and correspond to a first candidate word inputted to the analogous word adding part 186 to the analogous word adding part 186.

Word Data

To help understand the following explanation, word data (index table, word record, analogous word record and error information table) is explained here with reference to FIG. 4 to FIG. 7 except for the label string table.

Index Table

FIG. 4 shows an example of data contained in the index table of word data.

The index table is used for the word database 160 to search a word record which is classified by the leading characters (A–Z) of words.

The index table comprises a pointer indicating the top of respective recording areas of leading characters A to Z and the number of word records for each leading characters A–Z correlated to the pointers.

Word Record

FIG. 5 shows an example of data contained in the word record of word data.

As shown in FIG. 5, the word record comprises an index word (TarWord) which is matched to and compared with the first candidate word data [candidate word data (1)] generated by the candidate generating part 184 in the analogous word adding part 186, a pointer (NextP) to the next index word, the number of analogous words included in the word record (#Can), and the analogous word record (CanWord), correlated each other.

While it is shown in FIG. 5 that the analogous word record is directly correlated to the word record, any method may be used such as to correlate a pointer of the analogous word record to the word record, separating the analogous word record and the word record into separate files.

Also, a plurality of index words (TarWords) may be associated with a word record such that a label corresponding to a plurality of consecutive words is correlated to an index word including a plurality of words.

Analogous Word Record

FIG. 6 shows an example of data contained in the analogous word record of word data.

As shown in FIG. 6, the analogous word record comprises the number of input words (#m; #m is an integer larger than 0), input candidate words (aWord, aWord-1, aWord-2, . . . , aWord-m−1), the number of output words (#n; "n is an integer equal to 0 or larger than 0), analogous words (COWord, COWord-1, . . . , COWord-n), and an error code (ECode), correlated each other.

Among them, the number of input words (#m) indicates the number of preceding and following candidate words to be referred to (an example where m−1 words following the first candidate word is referred to is described hereunder) when the analogous word adding part 186 correlates the first candidate word inputted from the candidate word generating part 184 to an analogous word.

The input candidate words (aWord, aWord-1, aWord-2, . . . , aWord-m−1) are a word string which is matched to and compared with the first candidate words (TarWord, TarWord-1, TarWord-2, . . . , TarWord-m−1) which are consecutively inputted from the candidate word generating part 184 to the analogous word adding part 186.

In other words, in the analogous word adding part 186, the p-th first candidate word (TarWord) is not immediately correlated to an analogous word upon being inputted and, after m–first candidate words have been inputted to the analogous word adding part 186, each of m consecutive p-th to p+m−1-th first candidate words (TarWord, TarWord-1, TarWord-2, . . . , TarWord-m−1) is compared with each of the m input candidate words (aWord, aWord-1, aWord-2, . . . , aWord-m−1). Only when there is a match, the p-th first candidate word (aWord=TarWord) is correlated to n analogous words following the input candidate word in the analogous word record (COWord, COWord-1, . . . , COWord-n).

When an analogous word does not exist, the value of the number of output words is 0 and an analogous word is not correlated within the analogous record.

The method as shown in FIG. 6 for mapping between the first candidate word and an anatogous word in the analogous word record is now further explained.

As a method of correlating (mapping) between the first candidate words and the analogous words, the 4 methods as given blow are possible.

The First Method

In order to deal with a case where a single word is erroneously recognized as another single word, an analogous word including only a single word is correlated to the first candidate word including only a single word. An example of the first method may be a case where a first candidate word "read" is correlated to an analogous word "lead" for a possible case where "r" of the first candidate word "read" is not correctly pronounced. Further, an example of correlation in adopting the first method may include correlation between "sink" and "think", "fell" and "fill", "seat" and "sit", "better" and "bitter", "nut" and "not", "fund" and "found", "boat" and "bought" and "coal" and "call".

The Second Method

In order to deal with a case where a single word is erroneously recognized as a plurality of words, an analogous word including a plurality of words is correlated to a first candidate word including only a single word. An example may be the case where a first candidate word "jumped" is correlated to analogous words "jump", "and " for a possible case where "ed" of the first candidate word "jumped" is not correctly pronounced as "t". Further, an example of correlation in adopting the second method may include a correlation of "check in" to "chicken".

The Third Method

In order to deal with a case where a plurality of words are erroneously recognized as a single word, an analogous word including only a single word is correlated to a first candidate word including a plurality of words. An example of the third method may include correlating first candidate words "have", "to" to an analogous word "hat" for a possible case where the first candidate words "have", "to" are pronounced continuously. Further, an example of correlation in adopting the third method may include correlating "I will" to "aisle".

The Fourth Method

In order to deal with a case where a plurality of words are erroneously recognized as another plurality of words, an analogous word including a plurality of words is correlated to the first candidate word including a plurality of words.

Because it can be considered that each of the first to the third methods is a method which adds some limitation to the fourth method, the analogous word record as shown in FIG. 6 is prepared based on the fourth method and the first candidate word including a plurality of words is correlated to an analogous word including a plurality of words.

The analogous word is selected in place of a candidate word when the pronunciation of a speaker (user) using the computer 1 is incorrect. Therefore, it means that the speaker commits an error of an English pronunciation corresponding to the selected analogous word when an analogous word is eventually selected rather than a candidate word.

The error code (ECode) is added to the analogous word record from this view point to indicate an error of pronunciation corresponding to the eventually selected analogous word in the form of an error code.

Error Information Code Table

FIG. 7 shows an example of an error information code table of word data.

As shown in FIG. 7, the error information code table comprises an error code (ECode; 0, 1, 2, . . . ) and information indicating the content of the error (error information such as [r was pronounced as 1], [l was pronounced as r], [th was pronounced as s], etc., for example) correlated each other.

Vector Data Generating Part 160

In the speech recognition part 18, the vector generating part 160 (FIG. 3) processes speech data inputted from the speech interface part 150 to quantize features (tone, intensity and intonation, etc., of a sound) of the speech and generates vector data including values of the features to output them to the control part 162. For example, when the sampling frequency of speech data is 11 kHz, the vector generating part 160 processes the speech data for every 1/100 seconds to quantize a plurality of kinds of the features of the speech data for generating vector data comprising a plurality of elements.

Label Generating Part 182

The label generating part 182 converts vector data inputted from the vector data generating part 160 to data called a label which is analogous to a pronunciation symbol and outputs it to a candidate word generating part 184 sentence by sentence. The label generating part 182 does this by selecting a label corresponding to a plurality of consecutive vector data items using a label table which correlates a label generated from a sample of an actual speech spoken by a variety of persons (adult, child, male, female, etc.), for example, to a pattern of a plurality of consecutive vector data items. Incidentally, the term "sentence" as used in this specification does not necessarily correspond to an actual sentence in an actual text and simply indicates a unit of processing in the speech recognition.

Candidate Word Generating Part 184

The candidate word generating part 184 uses a label string table indicating correlation to English words to correlate one or more consecutive label strings corresponding to one or more English words to one or more combinations of one or more English words indicated by the label string, and outputs a combination of correlated English words to the candidate word generating part 186 as a first candidate word. (to simplify the explanation, a case where the candidate word generating part 184 correlates label corresponding to a single English word to a first candidate word including only a single English word is explained hereunder)

The candidate word generating part 184 in this case converts a label string directly to an English word (first candidate word) rather than converting the sound indicated by the label to an alphabet and then converting the converted alphabet string to an English word, for example. In other words, in generating "read" as a first candidate word, for example, the candidate word generating part 184 correlates the label string directly to a word "read" rather than replacing the label string with 4 alphabets "r", "e ","a", "d" and then correlating the word "read" as the first candidate word.

The candidate word generating part 184 outputs the generated first candidate word to the analogous word adding part 186 sentence by sentence in the form of an input record (InWord) as shown in FIG. 8 and an input record matrix (InMatrix) as shown in FIG. 9.

FIG. 8 shows a data structure of the input record (InWord) which the candidate word generating part 184 outputs to the analogous word adding part 186.

FIG. 9 shows a data structure of the input record matrix (InMtrix) which the candidate word generating part 184 outputs to the analogous word adding part 186.

As shown in FIG. 8, the candidate word generating part 184 adds data indicating that the word is the i-th word in a single sentence and is j-th first candidate word of the i-th word in a single sentence to the data (InWord) which indicates a word correlated to a label string and the length of the word and generates an input record (InWord) to output it to the analogous word adding part 186, where i and j are an integer with i being equal to or less than the maximum number of words (Maxi) while j being equal to or less than the maximum number of candidates (Maxj).

Further, as shown in FIG. 8, the candidate word generating part 184 generates probability data indicating the degree of match between the label string inputted from the label generating part 182 and the label string in the label string table corresponding to the selected English word, in other words, the probability in which the label string indicates the first candidate word, and adds it to data indicating the word of the input record and the length of the word for output to the analogous word adding part 186.

Also, when an input record (InWord) for 1 sentence has been generated, the candidate word generating part 184 generates an input record matrix indicating the maximum number of words (Maxi) contained in that sentence, the maximum number of candidates (Maxj) indicating how many first candidate words at most are correlated to the same label string (phonetic sound), and a flag FLG(ij) which indicates that a j-th word exists in a i-th word and outputs it to the analogous word adding part 186 along with an input record of 1 sentence.

When the candidate word generating part 184 fails to select a first candidate word of a label string corresponding to the i-th word, the flag FLG (il) is set to a value (0, for example) indicating that a first word does not exist in the i-th word.

Analogous Word Adding Part 186

Though the analogous word adding part 186 is not capable of correlating input records inputted from the candidate word generating part 184 to label strings, by taking the peculiarity of English pronunciation by a Japanese speaker into consideration, it adds an English word which possibly resembles the first candidate word to the first candidate word to generate a second candidate word for output to the selection part 188.

The operation of the analogous word adding part 186 is further explained in detail.

The analogous word adding part 186 outputs first of all the p-th first candidate word contained in an input record (InWord) of 1 sentence successively to the word database part 160 and requests to obtain a word record. The word database part 160 searches a word record (FIG. 5) using the index table (FIG. 4) to obtain a word record having an index word (TarWord) matching a word in the input record (InWord) and outputs it to the analogous word adding part 186.

When the analogous word adding part 186 obtains a word index of the p-th first candidate word, it compares the p-th to (p+m−1)-th words (InWord-p.j, InWord-p+1.j, . . . InWord-p+m−1.j) with m input words (aWord, aWord-1, aWord-2, . . . , aWord-m−1) of the analogous word records which are added to the word record inputted from the word database 160 and, when they do not match, adds n analogous words (COWord-1, COWord-2, . . . , COWord-n) to the p-th first candidate word to generate a second candidate word.

It is possible to modify the process such that the analogous word adding part 186 replaces the first candidate word with a analogous word to generate a second candidate word rather than adding a analogous word to the first candidate word to generate a second candidate word. In this case, the analogous word may or may not include the first candidate word.

Further, the analogous word adding part 186 outputs an error code (ECode) corresponding to the analogous word record added to the first candidate word to the word database part 160 and request to obtain error information indicated by the error code. The word database part 160 searches for the error information table (FIG. 7) in response to this request to obtain the error information and outputs it to the analogous word adding part 186.

FIG. 10 shows the data structure of an output record (OutWord) which the analogous word adding part 186 outputs to the selection part 188.

FIG. 11 shows the data structure of an output record matrix (OutMatrix) which the analogous word adding part 186 outputs to the selection part 188.

The analogous word adding part 186 adds a second candidate word, data indicating the length of the word, probability data, error information (or error information code), and data indicating that the word is the i'-th in 1 sentence and is the j'-th first candidate word of the i'-th word of 1 sentence, and outputs to the selection part 188 in the form an output record (OutWord) which is in a similar form to the input record (FIG. 8) as shown in FIG. 10.

When an output record (OutWord) of 1 sentence has been generated, the analogous word adding part 186 generates an output record matrix indicating the maximum number of words (Maxi') contained in that sentence, the maximum number of candidates (Maxj') indicating how many second candidate words at most are correlated to the same label string (phonetic sound), and a flag FLG(i'j') which indicates that a j'-th word exists in a i'-th word, and outputs it to the selection part 188 along with an output record of 1 sentence in the manner similar to the input record matrix (FIG. 9) as shown in FIG. 11.

Selection Part 188

The selection part 188 displays the second candidate word inputted from the analogous word adding part 186 as an output record, selects one of the second candidate words as a final result of recognition in response to users operation or based on the result of a syntactic parsing of the word string so far recognized, generates text data comprising a series of the selected words, and outputs it to the monitor 102, the speaker 104 or the printer 106.

Generation of text data by the selection part 188 is further explained.

When n1 second candidate words (OutWord-1.1, OutWord-1.2, . . . , OutWord-1. n1) exist for the first word of 1 sentence and n2 second candidate words exist for the second word, for example, the selection part 188 displays one of the second candidate words of each word, i.e., one of the second candidate words of the first word and one of the second candidate words of the second word, and so on, on the monitor 102 in the sequence of the words.

When the user clicks the second candidate word displayed in the window of the GUI image using the mouse 128, for example, the control part 162 displays the clicked second candidate word in inverted image and changes the displayed second candidate word each time the user clicks the same portion. When the user finally selects the second candidate word and operates on the mouse 128 or the keyboard 126 to that effect or moves to the selection of the next word, the selection part 188 makes the second candidate word displayed last be the finally selected result of the recognition.

The user repeats this operation as required and the selection part 188 selects a word in response to this operation to generate text data.

Incidentally, it is convenient to have the selection part 188 operate to display on the monitor 102 only a second candidate word which is highly possible to be selected as the final result of recognition or second candidate words in the order of higher possibility of being selected as the final result of recognition by taking the neighboring relationship of the words in displaying the second candidate words. A specific example of recognizing Japanese language is given here for the convenience of description. The candidate word generating part 184 recognizes a label obtained from Japanese speech data "akai-hana" (meaning "red flower") as being "takai-hana" ("takai" meaning "expensive" and "hana" meaning "flower") and "takai-hana" (same pronunciation but "takai" meaning "prominent" and "hana" meaning "nose"). The analogous word adding part 186 further adds an analogous word "akai-wana" ("akai" meaning "red" and "wana" meaning "trap") to the above two words and may possibly output these 3 words to the selection part 188 as second candidate words. In this case, if it is determined that the first half of the second candidate words is "akai" (meaning "red") in the selection part 188, it is considered that the likelihood of the second half of the second candidates is likely to be in the order of "hana" (meaning "flower"), "hana" (meaning "nose") and "wana" (meaning "trap"). In such case, the selection by a user can be minimized by having the selection part 188 display only "hana" (meaning "flower") and "hana" (meaning "nose") following "akai" (meaning "red") or "hana" (meaning "flower"), "hana" (meaning "nose") and "wana" (meaning "trap") in this order following "akai" (meaning "red").

Another specific example of recognizing English language spoken by a non-native speaker is given here for further comprehension. The candidate word generating part 184 recognizes a label obtained from English speech data "red rose" spoken by a non-native speaker as "red rose" and "lead roads". The analogous word adding part 186 further adds an analogous word "red nose" to the above two words and may possibly output these three words to the selection part 188 as second candidate words. In this case, if it is determined that the first half of the second candidate words is "red", it is considered that the second half of the second candidates is likely to be in the order of "rose" and "nose". In such case, the selection by a user can be minimized by having the selection part 188 display only "rose" and "nose" following "red".

If the processing in the selection part 188 is so modified as to display on the monitor 102 only a second candidate word corresponding to probability data which has a value equal to or higher than a threshold value set by a user, for example, by utilizing probability data added to the output record which is inputted from the analogous word adding part 186, only a second candidate word which is highly probable to be selected as a final result of the recognition is displayed on the monitor 102 thereby reducing a required selection operation by the user.

Operation of Computer 1

Figure 12:
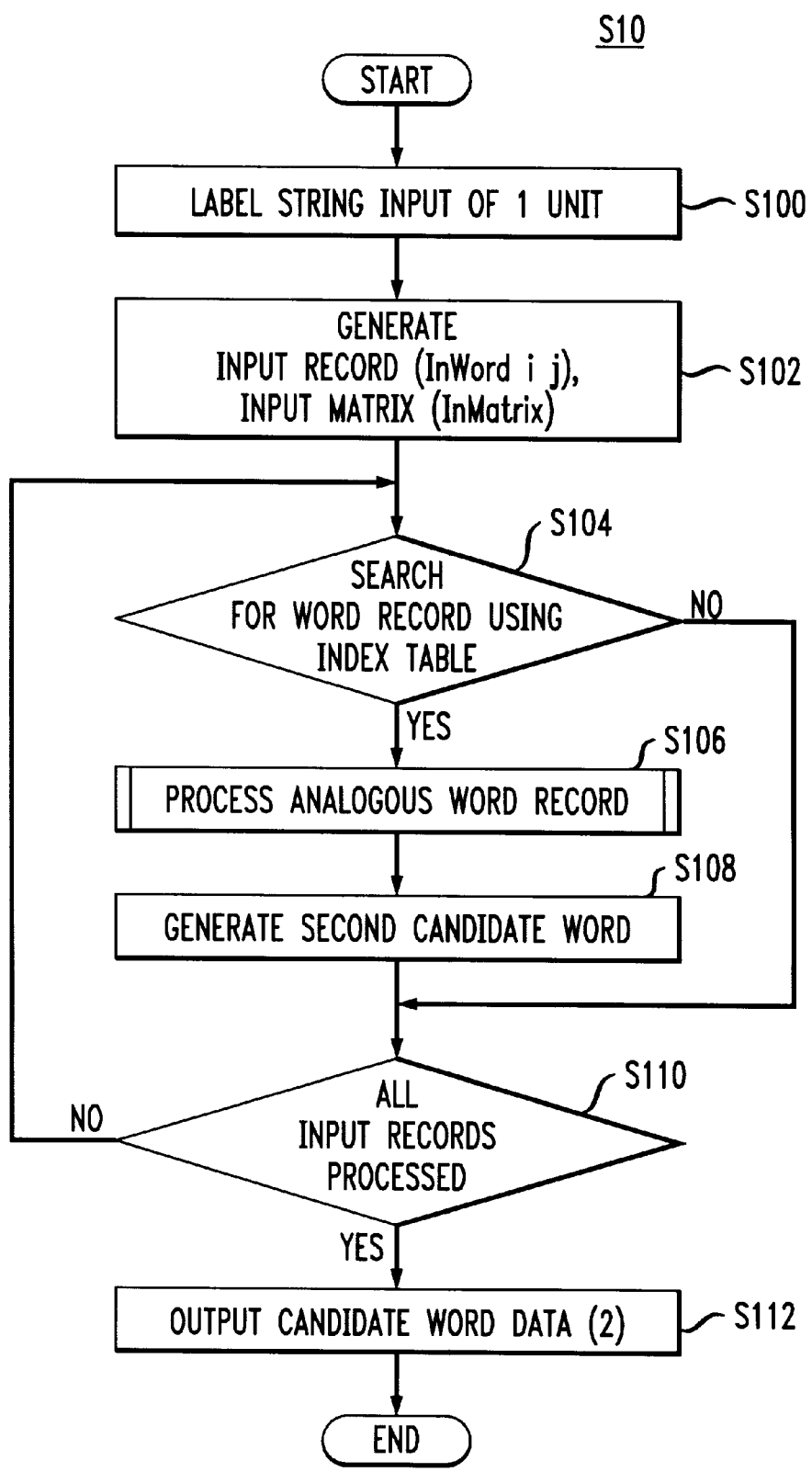
FIG. 12 is a flow chart showing the speech recognition processing of this invention in the computer.

The speech recognition processing in the computer 1 is now described hereunder with reference to FIG. 12.

FIG. 12 is a flow chart showing the speech recognition processing of this invention in the computer 1.

Only the basic process among the speech recognition processes of this invention is shown in FIG. 12 to simplify the explanation and processing using the probability data or the error information as described in the above are omitted as appropriate.

As shown in FIG. 12, in step 100 (S100), the vector data generating part 160 and the label generating part 182 (FIG. 3) processes speech data of 1 sentence (unit) pronounced by a Japanese user to convert it to a label string. The label string of 1 sentence generated by the vector data generating part 160 and the label generating part 182 is inputted to the candidate word generating part 184.

In step 102 (S102), the candidate word generating part 184 correlates the label string of 1 sentence inputted from the label generating part 182 to a first candidate word, outputs it to the analogous word adding part 186 in the form of an input record (InWord) as shown in FIG. 8, and further generates an input record matrix (InMatrix) as shown in FIG. 9 to output it to the analogous word adding part 186.

In step 104 (S104), the analogous word adding part 186 requests the word database part 160 to retrieve a word record (FIG. 5) of a first candidate word contained in an input record which is to be processed. The word database part 160 searches using an index table (FIG. 4) in response to the request by the analogous word adding part 186 and, when a word record corresponding to the first candidate word (input record) is obtained as a result of the search, outputs the obtained word record to the analogous word adding part 186 and proceeds to the process of S 106. When a word record corresponding to the first candidate word (input record) is not obtained, the word database part 160 proceeds to the process of S110.

In step 106 (S106), the analogous word adding part 186 processes a analogous word record (FIG. 6) of a word record inputted from the word database part 160 and obtains a analogous word corresponding to the first candidate word (input record).

In step 108 (S108), the obtained analogous word is added to the first candidate word to generate a second candidate word.

In step 110 (S110), the analogous word adding part 186 determines whether or not all input records contained in 1 sentence have been processed and, if the all input records have been processed, proceeds to the process of S110. If the all input records have not been processed, the analogous word adding part 186 changes the item to be processed to the next input record and returns to the process of S104.

In step 112 (S112), the analogous word adding part 186 outputs the second candidate word generated in S108 to the selection part 188 in the form of an output record as shown in FIG. 10. Further, the analogous word adding part 186 generates an output record matrix (FIG. 11) corresponding to the second candidate word and outputs it to the selection part 188. The selection part 188 displays the inputted second candidate word in the window of the GUI image on the monitor 102 and outputs the final result of the recognition as English text data in response to users operation.

Modified Example

If the process of the selection part 188 is so modified as to display error information added to the selected word on the monitor 102 when the user selects as a final result of the recognition a word added to the second candidate word as a analogous word in the analogous word adding part 186, the user can find a defect of his or her English pronunciation so that the user can use the computer 1 as a learning apparatus of English pronunciation in addition to the use as a speech recognition apparatus. As a method of displaying error information, the shape of the mouth to pronounce correctly may be displayed or a correct pronunciation may be voice synthesized for listening by the user.

While a process of recognizing an English text from English spoken by a Japanese speaker is exemplarily shown in the above described mode of practice, the speech recognition processing of this invention is not limited to such case and can be widely applied in order to deal with degradation of recognition rate to a case where pronunciation is different even in a same language such as a case where an American who speaks American English prepares a text using a speech recognition apparatus which is adjusted to British English, or a case where an individual person has a peculiarity or obscurity in pronunciation.

As described in the above, because an analogous word is added in the analogous word adding part 186 to the first candidate word recognized by the candidate word generating part 184 to generate a second candidate word in the speech recognition process of this invention, the speech recognition rate is improved. For the purpose of convenience, a case where Japanese language is recognized by the computer 1 is described as a specific example.

For example, even when a user intends to pronounce "akai-hana" (meaning "red flower") in Japanese, the pronunciation of "a" sound may be obscure by some reason and the label generating part 182 may generate a label string which is neither "akai-hana" (meaning "red flower") nor "takai-hana" (meaning "prominent nose").

Or, even when a user intends to pronounce "red-rose" in English, the pronunciation of "r" sounds may be obscure by some reason and the label generating part 182 may generate a label string which is neither "red-rose" nor "lead nose", for another example.

Even when the candidate word generating part 184 selects "takai-hana" (meaning "prominent nose") as a first candidate word corresponding to this label string and outputs it to the analogous word adding part 186, the analogous word adding part 186 can add "akai-hana" (meaning "red nose") and "akai-hana" (meaning "red flower") to the first candidate word as the first word into second candidate words if the word record is suitably prepared. Therefore, the intended "akai-hana" (meaning "red flower") which was not included in the first candidate word prepared by the candidate word generating part 184 will be also displayed on the monitor 102 to allow the user to select a correct recognition result among the second candidate words.

Or, even when the candidate word generating part 184 selects "leads nose" as a first candidate word corresponding to this label string and outputs it to the analogous word adding part 186, the analogous word adding part 186 can add "red rose" and "red nose" to the first candidate word. Therefore, the intended "red rose" which was not included in the first candidate word prepared by the candidate word generating part 184 will be also displayed on the monitor 102 to allow the user to select a correct recognition result among the second candidate word.

While a speech recognition method is conventionally implemented by combining a grammatical parsing process (a noun tends to be placed in a specific position in a sentence, etc.) and a language model process (likelihood of a string of words) in a pure speech processing, the speech recognition rate is largely improved and a remarkable effect is resulted if a analogous word is added according to the speech recognition method of this invention before such processes are performed.

Second embodiment

If a candidate word is selected as a result of speech recognition in the speech recognition program 16 shown in FIG. 3, it is meant that the pronunciation by the user (speaker) approaches a native speaker and is as correct as it can be recognized with a high recognition rate even using a conventional speech recognition apparatus other than this invention. Conversely, if an analogous word is selected, it is meant that the speaker's pronunciation contains some error or an obscurity. This is true for a case where the word intended by the user is included in the analogous word in the speech recognition program 16.

Accordingly, it is seen that speaker is assisted in learning pronunciation and user's pronunciation can be corrected by presenting to the speaker information (pronunciation correcting information) of how the pronunciation is wrong and how the speaker should pronounce in order to pronounce correctly when the word intended by the user is recognized as an analogous word.

The pronunciation correcting method to be shown hereunder as a second embodiment focuses at this point and modifies the speech recognition process shown as the first embodiment so as to display an image showing pronunciation correcting information to the speaker when it is determined that the speaker's pronunciation is incorrect.

Computer 2

Figure 13:
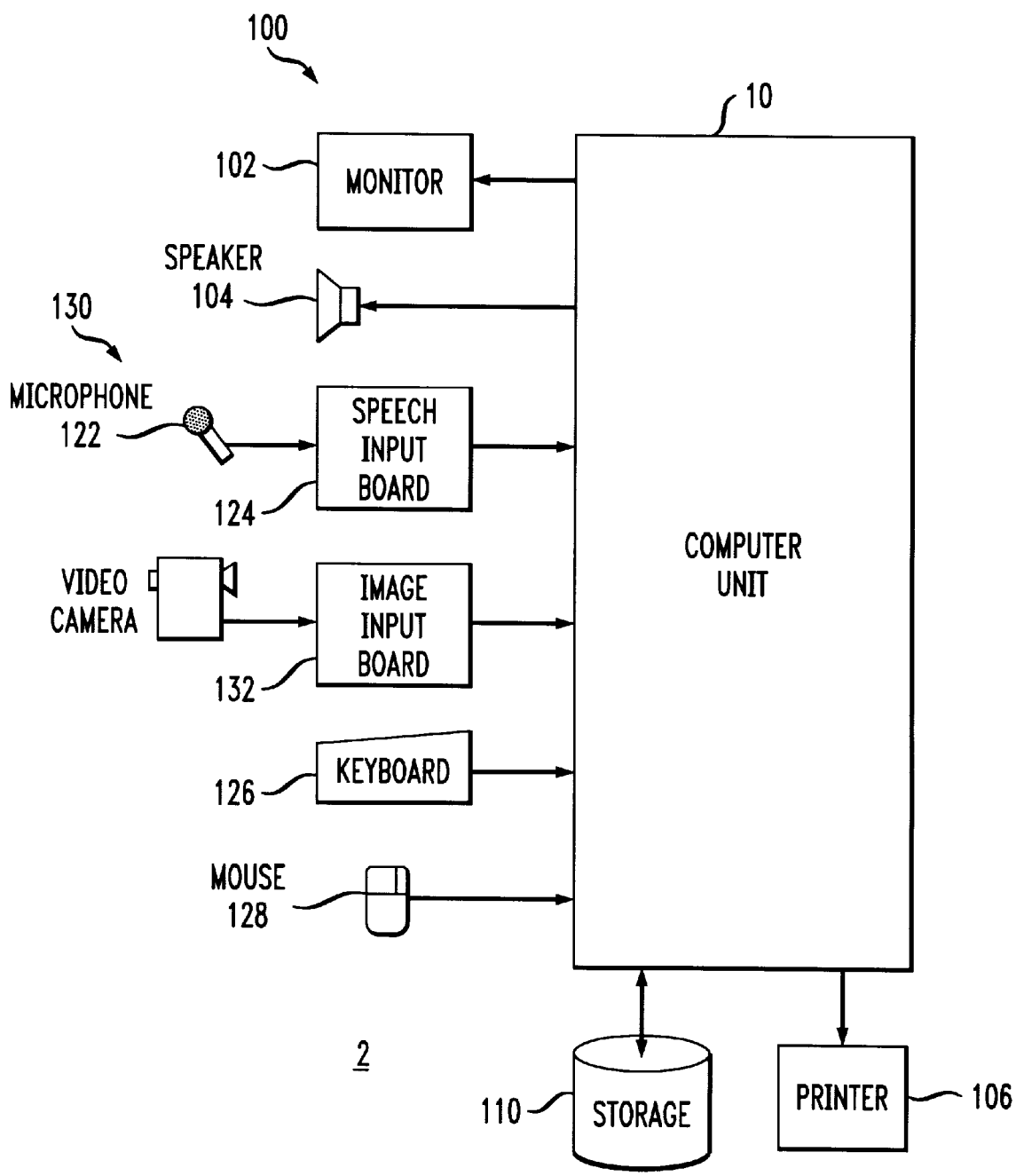
FIG. 13 is a diagram showing the configuration of a computer implementing the speech recognition process and the pronunciation correcting method of this invention.

FIG. 13 is a diagram showing the configuration of a computer 2 implementing the speech recognition process and the pronunciation correcting method of this invention. The components shown in the following drawings are same as those shown in the preceding drawings by same reference numbers unless otherwise mentioned.

As shown in FIG. 13, the computer 2 employs a configuration which replaces the input device 120 of the computer 1 (FIG. 1) with an input device 130 which has a structure in which an image input board 132 is added to the input device 120. The image input board 132 is used for capturing image data used for a pronunciation correcting image (FIG. 19) into a video camera, for example.

Software 20

Figure 14:
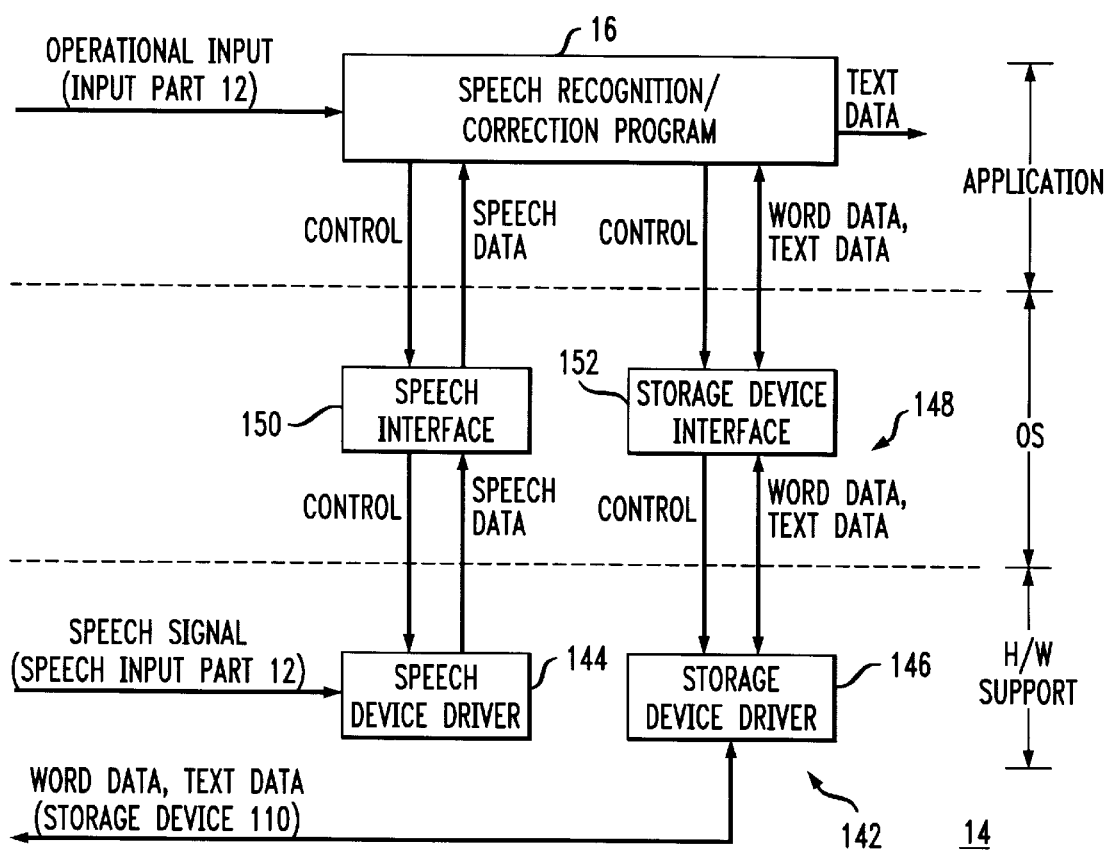
FIG. 14 is a diagram showing a software implementing the speech recognition process and the pronunciation correcting method of this invention.

FIG. 14 is a diagram showing a software 20 implementing the speech recognition process and the pronunciation correcting method of this invention.

As shown in FIG. 14, the software 20 employs a configuration which replaces the speech recognition program 16 in the software 14 (FIG. 2) with a speech recognition/correction program 22.

Beside data inputted and outputted among the components in the software 14, an image showing pronunciation correcting information (pronunciation correcting image) to correct the pronunciation by the user (speaker) is displayed in a monitor 102 and the like in place of the result of recognition (text data) in the software 14.

Speech recognition/correction program 22

Figure 15:
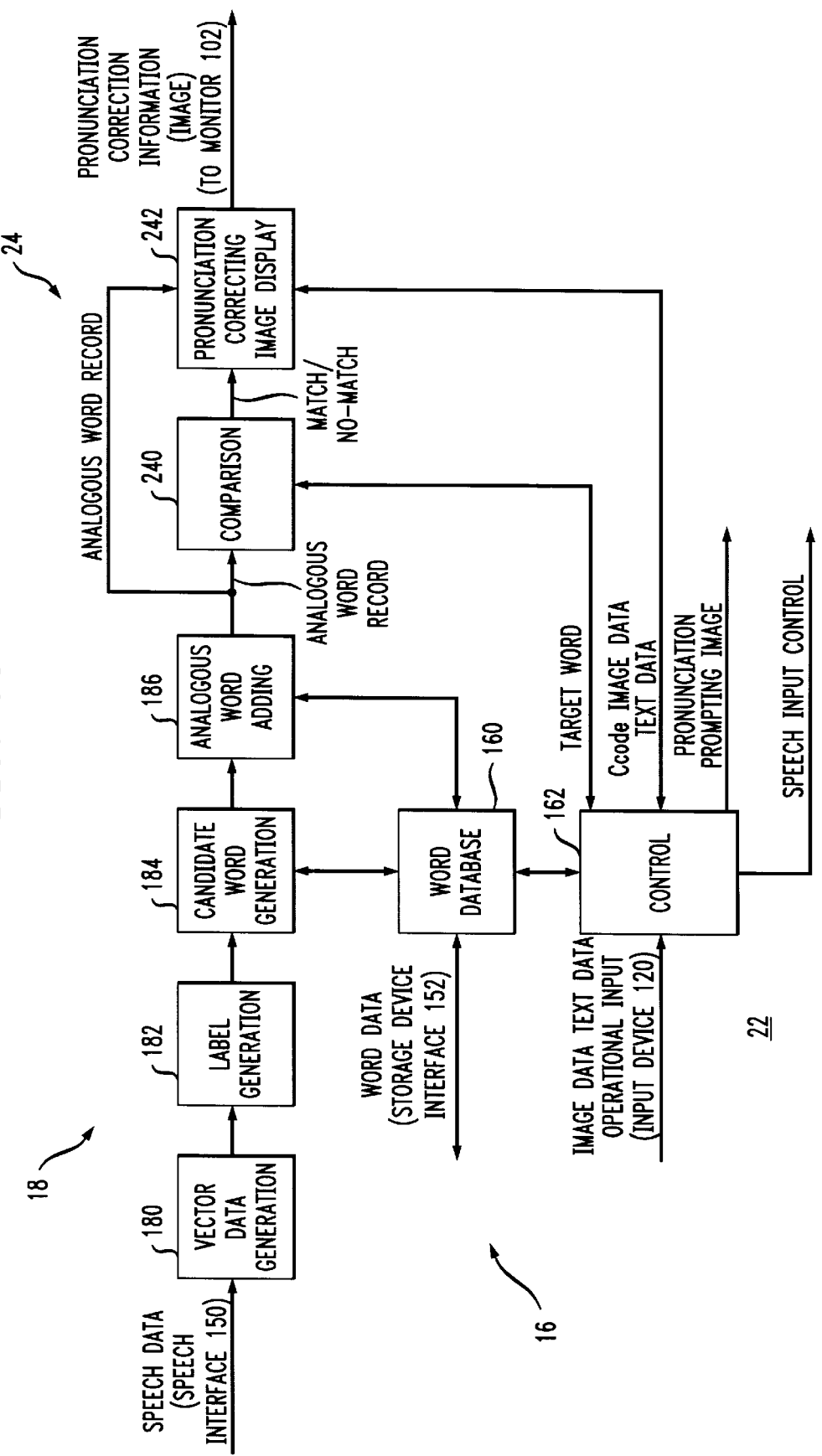
FIG. 15 is a diagram showing the configuration of the speech recognition/correction program shown in FIG. 14.

FIG. 15 is a diagram showing the configuration of the speech recognition/correction program 22 shown in FIG. 14.

As shown in FIG. 15, the speech recognition/correction program 22 comprises a speech recognition program 16 (FIG. 3) and a pronunciation correction program 24 (the selection part 188 is omitted).

Modification of analogous word adding part 186

In the speech recognition/correction program 22, the analogous word adding part 186 outputs an analogous word record (FIG. 18) to a comparison part 240 and a pronunciation correcting information display part 242 in contrast to the speech recognition program 16.

Modification of control part 162

FIG. 16 is a diagram showing an example of the pronunciation prompting image which the control part 162 shown in FIG. 15 displays.

FIG. 17 (A), (B) are diagrams showing an example of correcting information index generated by the word database part 160 shown in FIG. 15 in which (A) shows a pronunciation correcting image for correcting pronunciation of "r" and (B) shows a pronunciation correcting image for correcting pronunciation of "l".

FIG. 18 is a diagram showing an analogous word record generated by the word database part 160 in the second embodiment of this invention.

The control part 162 indicates to the user a word to pronounce ("read" in FIG. 16) as shown in FIG. 16, generates pronunciation prompting image to prompt to pronounce (an image including a text "please pronounce "read", in FIG. 16) for display in the monitor 102, and outputs a word indicated to the user to pronounce (target word) to a comparison part 240.

When a correction information code (Ccode; FIG. 18) is inputted from the pronunciation correcting image display part 242, the control part 162 outputs the correction information code to the word database part 160 and obtains a correction information index (FIG. 17 (A), (B)) indicated by the correction information code from the word database part 160. Further, the control part 162 reads out image data and text data indicated by n entries (n is an integer; n=8 in FIG. 17 (A), (B)) included in the correction information index from the storage device 110 and outputs them to the pronunciation correcting image display part 242.

Figure 19:
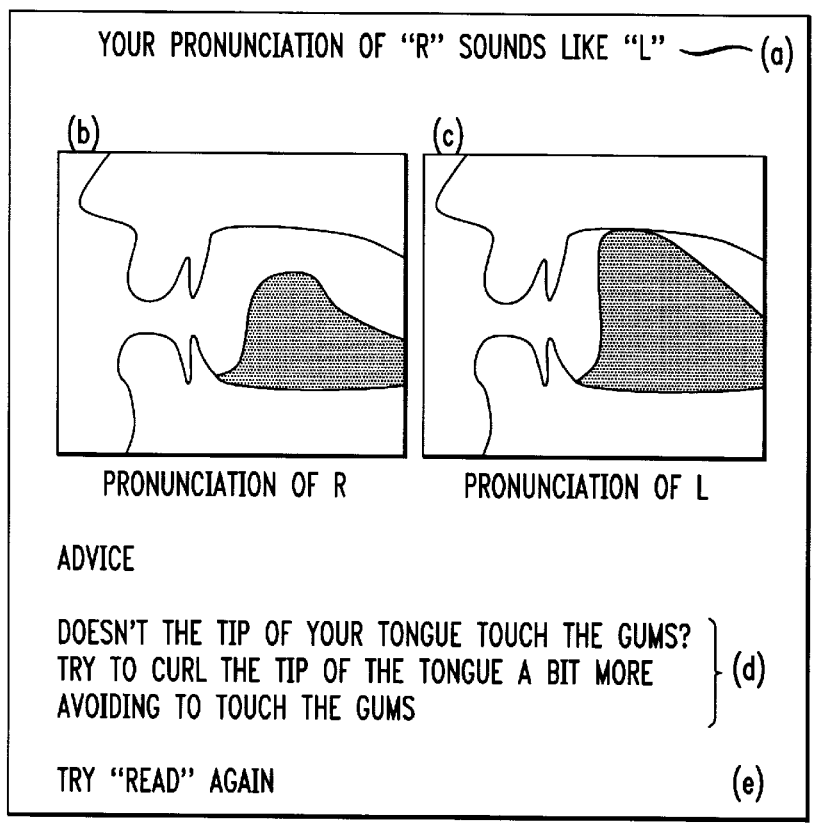
FIG. 19 is a diagram showing an example of a first pronunciation correcting image indicated by the correction information index shown in FIG. 17 (A).

FIG. 19 is a diagram showing an example of a first pronunciation correcting image indicated by the correction information index shown in FIG. 17 (A). In FIG. 19, the text data corresponding to the entries 5 to 7 shown in FIG. 17 (A) is omitted for simplifying the illustration in the figure.

The control part 162 also stores an entry included in the correction information index as shown in FIG. 17 (A) and image data (Image) and text data (Text) as shown in FIG. 19 in correlation each other in the storage device 110.

The correction information index shown in FIG. 17 (A) is used for correcting user's pronunciation of "r" and includes entries (entries 1 to 4, 8) indicating; text data indicating a point of pronunciation to be corrected, image data indicating the shape of the mouth in pronouncing "r", image data indicating the shape of the mouth in pronouncing "l", text data giving an advice for pronounce "r", an example of a word including "r", an example of a word including "l", text data showing an example of a word including "r" and "l", and text data showing an example of a sentence in which "r" and "l" appear. A pronunciation correcting image as shown in FIG. 19 is generated from the correction information index as shown in FIG. 17 (A) and displayed in the monitor 102.

The correction information index as shown in FIG. 17 (B) is used for correcting user's pronunciation of "l" and includes; text data indicating the point of pronunciation to be corrected, image data of the shape of the mouth in pronouncing "l", image data of the shape of the mouth in pronouncing "r", text data giving an advice for pronounce "l", an example of a word including "l", an example of a word including "r", text data showing an example of a word including "r" and "l", and text data showing an example of a sentence in which "r" and "l" appear.

Modification of Word Database 160

The word database 160 generates the correction information index as shown in FIG. 17 (A), (B) in place of the error information code table (FIG. 7) in contrast to that in the software 14 and stores it in the storage device 110 as word data.

The word database 160 also adds a correction information code (Ccode; correction code) indicating either one of the correction information index to the analogous word record in place of the error code (Ecode; FIG. 6) and stores it in the storage device 110 as shown in FIG. 18.

When a correction information code is inputted from the pronunciation correcting image display part 242 via the control part 162, the word database 160 also reads out a correction information index (FIG. 17 (A), (B)) corresponding to the inputted correction information code (FIG. 18) from the storage device 110 and outputs it to the control part 162.

Comparison Part 240

The comparison part 240 (FIG. 15) compares each of the analogous words included in the analogous word record (FIG. 18) inputted from the analogous word adding part 186 with the target word inputted from the control part 162 to determine which of the analogous words the target word matches. If the target word matches the analogous word, the comparison part 240 notifies the pronouncing correcting image display part 242 of that effect. If the comparison does not match, the comparison part 242 notifies the pronouncing correcting image display part 242 of that effect.

Pronunciation correcting image display part 242

When the comparison part 240 determines that the analogous word matched either one of the target words, the pronunciation correcting image display part 242 requests the control part 162 to obtain image data and text data indicated by the correction information index (FIG. 17 (A), (B)) which is indicated by the correction information code (Ccode) added to the analogous word record (FIG. 18).

When the control part 162 reads out the image data and the text data from the storage device 110 and outputs them to the pronunciation correcting image display part 242, the pronunciation correcting image display part 242 places these data in positions referenced by (a) to (e) in FIG. 19 and generates a pronunciation correcting image for display in the monitor 102.

Operation of Speech recognition/correction program 22

The operation of speech recognition/correction program 22 is now described hereunder.

Figure 20:
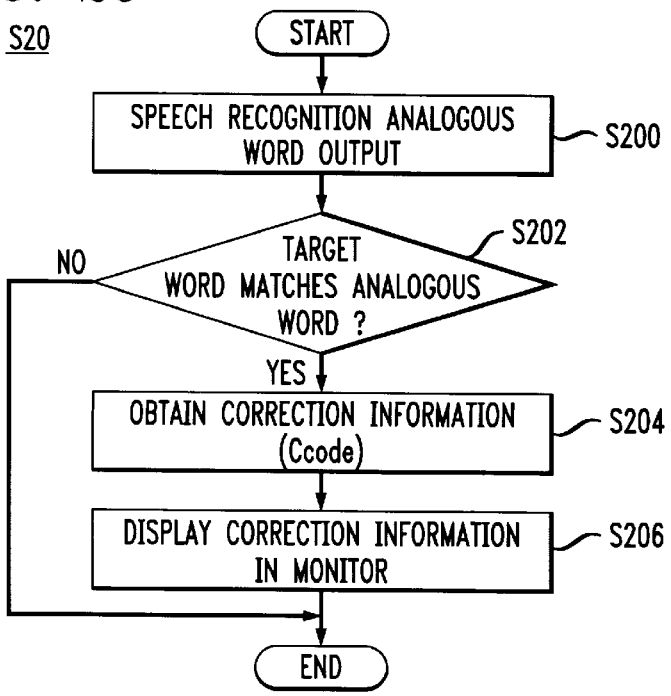
FIG. 20 is a flow chart showing the process (S20) of the speech recognition/correction program 22 (FIG. 15) in the second embodiment.

FIG. 20 is a flow chart showing the process (S20) of the speech recognition/correction program 22 (FIG. 15) in the second embodiment.

In FIG. 20, as shown in step 200 (S200), the control part 162 displays a pronunciation prompting image prompting the user to pronounce a word "read" in the monitor 102 in response to an operation input by the user as shown in FIG. 16. The control part 162 outputs a target word "read" to the comparison part 240.

When the user pronounces "read" in response to the pronunciation prompting image, the vector data generating part 180, the label data generating part 182, the candidate word generating part 184 and the analogous word adding part 186 of the speech recognition program 16 (FIG. 15) recognizes the speech pronounced by the user and outputs an analogous word record to the comparison part 240 and the pronunciation correcting image display part 242.

When the user pronounces "read" correctly, the candidate word generating part 184 outputs a candidate words including the word "read" to the analogous word adding part 186 which in turn outputs an analogous word record (FIG. 18) including the word "lead" and the like as an analogous word to the comparison part 240 and the pronunciation correcting image display part 242 as shown in the first embodiment.

Conversely, if the user pronounce "read" incorrectly by failing to distinguish between the pronunciation of "r" and "l", for example, the candidate word generating part 184 outputs candidate words including a word "lead" and the like as an analogous word to the analogous word adding part 186 which in turn outputs an analogous word record including a word "read" and the like as an analogous word to the comparison part 240 and the pronunciation correcting image display part 242.

In step 202 (S202), the comparison part 240 compares the target word inputted from the control part 162 with the analogous words included in the analogous word record inputted from the analogous word adding part 186. If the target word does not match either one of the analogous words, the comparison part 240 notifies the pronunciation correcting image display part 242 of that effect, ends the process of correcting/learning the pronunciation of "read", and proceeds to the process of correcting/learning the pronunciation of the next word, for example. Otherwise, the comparison part 240 notifies the pronunciation correcting image display part 242 that the target word matches one of the analogous words and proceeds to the process of S204.

In step 204 (S204), the pronunciation correcting image display part 242 obtains a correction information code (Ccode) from the analogous word record. The pronunciation correcting image display part 242 further outputs a correction information record to the control part 162 and requests to obtain image data and text data which are used in the pronunciation correcting image.

The control part 162 obtains a correction information index as shown in FIG. 17 (A) from the word database part 160 in response to the request from the pronunciation correcting image display part 242 and reads out image data and text data indicated by respective entries (entries 1 to 4, 8) of the correction information index for output to the pronunciation correcting image display part 242.

In step 206 (S206), the pronunciation correcting image display part 242 generates a pronunciation correcting image in which image data and text data corresponding to respective entries (entries 1 to 4, 8) of the correction information index inputted from the control part 162 are placed in positions (a) to (e) shown in FIG. 19 for display in the monitor 102, ends the process of "read" and proceeds to the process of correcting/learning the pronunciation of the next word, for example.

Modification

While the second embodiment shows a case where the pronunciation correction information includes only text data and image data, the pronunciation correction information may include other kind of data. For example, the pronunciation correction information may include speech data of a correct pronunciation and be displayed in the monitor 102 while speech data is outputted via the speaker 104.

Also, while the second embodiment shows a case where the analogous words and the pronunciation correction information code are managed in correlation each other, the speech recognition/correction program 22 may be so configured that they are managed by being included in the analogous word record shown in FIG. 6.

Also, while the second embodiment shows a case where the speech recognition/correction program 22 outputs only the pronunciation correction information, it may be so configured that it outputs both the pronunciation correction information and the error information.

Also, while the second embodiment shows a case where the control part 162 displays a pronunciation prompting image in the monitor 102 and the pronunciation correcting image display part 242 displays a pronunciation correction information in the monitor 102, the speech recognition/correction program 22 may be so configured that either one of these components displays both of these images in the monitor 102.

In addition, it is not necessary for all information displayed in the pronunciation correcting image (FIG. 19) to be registered in the correction information index (FIG. 17 (A), (B)).

For example, the point to be corrected and the text data prompting to repeat pronunciation shown in FIG. 17 (A) may be registered in the correction information index or written beforehand in the pronunciation correcting image instead of being registered in the correction information index depending on the way of structuring the speech recognition/correction program 22 (FIG. 15).

Third embodiment

A pronunciation learning method to which is applied the pronunciation correcting method shown as the second embodiment is now described as the third embodiment. The pronunciation learning method improves the operation of the pronunciation recognition/correction program 22 shown in FIG. 20 and has a pronunciation correcting image indicating an expansive learning (FIG. 21 to FIG. 23) to be displayed in addition to the pronunciation correcting image indicating the pronunciation prompting image shown in FIGS. 16/19 and fundamentals of pronunciation for the convenience of learning pronunciation by the user.

FIGS. 21 to 23 are diagrams showing examples of the second to the fourth pronunciation correcting images used in the pronunciation learning method shown as the third embodiment. In the third embodiment, the speech recognition/correction program 22 displays pronunciation correcting images shown in FIGS. 21 to 23 in addition to the pronunciation correcting images shown in FIGS. 16 and 19.

The second pronunciation correcting image shown in FIG. 21 is displayed when the speech recognition/correction program 22 determines that the user pronounced "read" correctly by seeing the first pronunciation correcting image (FIG. 19) and is used for affirming that the user pronounces by correctly distinguishing between "r" and "l".

The second pronunciation correcting image is not displayed until the user pronounces "read" correctly in response to the first pronunciation correcting image and repeatedly displayed until the user pronounces all the words "write", "raw", "long", "light" indicated in the second pronunciation correcting image.

The second pronunciation correcting image also includes the entries 5 and 6 of the correction information index (FIG. 17 (A)) which was omitted in the first pronunciation correcting image.

The third pronunciation correcting image shown in FIG. 22 is displayed when the speech recognition/correction program 22 determines that the user correctly pronounced the words in the second pronunciation correcting image (FIG. 21) and is used for further advanced training to distinguish between "r" and "l".

The third pronunciation correcting image is not displayed until the user pronounces all words indicated in the second pronunciation correcting image correctly and repeatedly displayed until the user pronounces all the sentences "write letters", "great trouble" indicated in the third pronunciation correcting image.

The second pronunciation correcting image also includes the entry 7 of the correction information index (FIG. 17 (A)) which was omitted in the first pronunciation correcting image.

The fourth pronunciation correcting image shown in FIG. 23 is displayed when the speech recognition/correction program 22 determines that the user correctly pronounced all the sentences in the third pronunciation correcting image (FIG. 22) and is used for affirming that the user can pronounce with "r" and "l" distinguished.

The fourth pronunciation correcting image is not displayed until the user pronounces all sentences indicated in the third pronunciation correcting image correctly and repeatedly displayed until the user correctly pronounces the sentence "The river rose several feet and finally overflowed its banks".

Operation of speech recognition/correction program 22

The operation of speech recognition/correction program 22 in the third embodiment in described hereunder.

FIG. 24 is a flow chart showing the operation of speech recognition/correction program 22 (S30) in the third embodiment.

FIG. 25 is a diagram showing an example of a learning item list generated in the list up process (S300) of the learning items shown in FIG. 24.

As shown in FIG. 24, in step 300 (S300), the speech recognition/correction program 22 compares a target word with an analogous words to obtain a target word matching an analogous word. The speech recognition/correction program 22 further determines which pronunciation the user does not pronounce well ("r", "th", for example) in the obtained target word and lists it up as a learning item as shown in FIG. 25.

In step 302 (S302), the speech recognition/correction program 22 determines whether or not the learning item listed up in the process of S300 remains not learnt. The speech recognition/correction program 22 proceeds to the process of S304 when a learning item remains while it ends the process otherwise.

In step 304 (S304), the speech recognition/correction program 22 takes out one of the learning items listed up in the process of S300.

In step 306 (S306), the speech recognition/correction program 22 displays pronunciation prompting image (FIG. 16) and pronunciation correcting image (FIG. 19) as shown in the second embodiment to have the user learn pronunciation.

In step 308 (S308), the speech recognition/correction program 22 recognizes user's pronunciation and determines that the user pronounced correctly when the word obtained as a result of recognition matches a candidate word, proceeding to the process of S310. Otherwise, it is determined that the user did not pronounce correctly and returns to the process of S306.

In step 310 (S310), the speech recognition/correction program 22 determines whether or not there is an exercise not used in learning (the second to the fourth pronunciation correcting images; FIGS. 21 to 23). When an exercise remains, the speech recognition/correction program 22 proceeds to the process of S312 while it returns to the process of S302 otherwise.

In step 312 (S312), the speech recognition/correction program 22 displays one of the second to the fourth pronunciation correcting images to let the user learn pronunciation.

In step 314 (S314), the speech recognition/correction program 22 determines whether or not the user could correctly pronounce and proceeds to the process of S316 when the user pronounced correctly. Otherwise, it returns to the process of S312.

In step 316 (S316), the speech recognition/correction program 22 determines whether or not there is other error in user's pronunciation than the learning items listed up in the process of S300. If there is such error, the speech recognition/correction program 22 proceeds to the process of S318 while it returns to the process of S310 otherwise.

In step 318 (S318), the speech recognition/correction program 22 adds the error of user's pronunciation found in the process of S316 to the learning items and returns to the process of S310.

Effect of the Invention

As described in the above, the speech recognition apparatus and the method thereof of this invention is conceived in view of the above described problems of the conventional technology and recognizes words contained in a speech of a predetermined language spoken by a speaker whose native language is other than the predetermined language (non native) and translates the words into the words of the predetermined language intended by the speaker to generate correct text data.

Also, the speech recognition apparatus and a method thereof of this invention translates a speech spoken by a speaker in any region into a word intended by the speaker to enable correct text data to be generated even when pronunciation of a same language varies due to the difference of the region where the language is spoken.

Further, the speech correcting apparatus and method of this invention can point out a problem of speaker's pronunciation by utilizing data obtained in said speech recognition apparatus and in the course of processing the method of this invention, and have the speaker learn pronunciation by a native speaker to correct the speaker's pronunciation.

Further, the speech correcting apparatus and method of this invention can point out an error by automatically comparing the speaker's pronunciation with a correct pronunciation and present detailed information as to how the speaker should correct pronunciation to correct the pronunciation.

What is claimed is:

1. A speech recognition apparatus for recognizing words from speech data representing one or more words contained in speech, comprising:

candidate word correlating means for correlating each of one or more speech data items of words to one or more sets of candidates comprising a combination of one or more of said words obtained by recognizing each of one or more of said speech data items, the one or more of said words obtained by recognizing each of one or more of said speech data items being candidate words;

analogous word correlating means for correlating each of said candidate words correlated to each of one or more of the speech data items of said words to null or more sets of a combination of one or more of said words which may correspond to a pronunciation of each of said candidate words, the one or more of said words which may correspond to a pronunciation of each of said candidate words being analogous words; and speech data recognition means for selecting either said candidate word correlated to each of one or more of said speech data items of words or said analogous word correlated to each of said candidate words as a recognition of each of said speech data items of words.

2. The speech recognition apparatus of claim 1, wherein:

said speech data represents one or more words contained in a speech of a predetermined language;

said candidate correlating means correlates each of one or more speech data items of said words to one or more sets of candidate words of said predetermined language obtained by recognizing each of the one or more speech data items;

said analogous word correlating means correlates each of said candidate words correlated to each of the one or more speech data items of said words to null or more sets of analogous words of said predetermined language which may correspond to the pronunciation of each of said candidate words; and said speech data recognition means selects either said candidate word correlated to each of one or more of said speech data items of words or said analogous word correlated to each of said candidate word as a recognition result of each of one or more of speech data items of said words.

3. The speech recognition apparatus of claim 2, wherein:

the speech of said predetermined language is pronounced by a speaker who mainly speaks a language other than said predetermined language;

analogous word storage means is provided for storing null or more sets of words of said predetermined language which may correspond to each of one or more speech data items of the words contained in the speech of said predetermined language in correlation to each of one or more words of said predetermined language as said analogous word of each of one or more words of said predetermined language when each of one or more words of said predetermined language is pronounced by said speaker; and said analogous word correlating means correlates null or more of said analogous words which were stored beforehand in correlation to each of one or more words of said predetermined language to each of said candidate words.

4. The speech recognition apparatus of claim 3, wherein:

said candidate word correlating means associates each of said candidate words correlated to the speech data with probability data indicating a likelihood of each of said candidate words correlated to the speech data; and said speech data recognition means selects only said candidate word having a value of said probability data within a predetermined range as a recognition result of the speech data of said words.

5. The speech recognition apparatus of claim 3, wherein:

said candidate word correlating means associates each of said candidate words correlated to the speech data with error information indicating an error of pronunciation corresponding to each of said candidate words.

6. A speech recognition apparatus for recognizing one or more words of a predetermined language from speech data representing one or more words of said predetermined language contained in a speech of said predetermined language spoken by a speaker who mainly speaks a language other than the predetermined language, comprising:

word correlating means for correlating each of one or more speech data items of words of said predetermined language to at least one of a word of said predetermined language obtained by recognizing each of the one or more speech data items and one or more words of said predetermined language which are possibly spoken by said speaker; and speech data recognition means for selecting one of words each correlated to each of one or more speech data items of said words as a recognition result of each of one or more speech data items of said words.

7. A speech recognition method for recognizing words from speech data representing one or more words contained in a speech comprising the steps of:

correlating each of one or more speech data items of words to one or more sets of candidates comprising a combination of one or more of said words obtained by recognizing each of one or more of said speech data items, the one or more of said words obtained by recognizing each of one or more of said speech data items being candidate words;

correlating each of said candidate words correlated to each of one or more of the speech data items of said words to null or more sets of a combination of one or more of said words which may correspond to a pronunciation of each of said candidate words, the one or more of said words which may correspond to a pronunciation of each of said candidate words being analogous words; and selecting either said candidate word correlated to each of one or more of said speech data items of words or said analogous word correlated to each of said candidate words as a recognition result of each of said speech data items of words.

8. A speech recognition method for recognizing one or more words of a predetermined language from speech data representing one or more words of said predetermined language contained in a speech of said predetermined language spoken by a speaker who mainly speaks a language other than the predetermined language, comprising the steps of:

correlating each of one or more speech data items of words of said predetermined language to at least one of a word of said predetermined language obtained by recognizing each of the one or more speech data items and one or more words of said predetermined language which are possibly spoken by said speaker; and selecting one of words each correlated to each of one or more speech data items of said words as a recognition result of each of one or more speech data items of said words.

9. In a speech recognition apparatus for recognizing one or more words from speech data representing one or more words contained in a speech, a computer readable recording medium recording a program for causing a computer to execute:

a candidate word correlating step for correlating each of one or more speech data items of words to one or more sets of candidates comprising a combination of one or more of said words obtained by recognizing each of one or more of said speech data items, the one or more of said words obtained by recognizing each of one or more of said speech data items being candidate words;

an analogous word correlating step for correlating each of said candidate words correlated to each of one or more of the speech data items of said words to null or more sets of a combination of one or more of said words which may correspond to pronunciation of each of said candidate words, the one or more of said words which may correspond to a pronunciation of each of said candidate words being analogous words; and a speech recognition step for selecting either said candidate word correlated to each of one or more of said speech data items of words or said analogous word correlated to each of said candidate words as a recognition result of each of said speech data items of words.

10. The recording medium of claim 9, wherein:

said speech data represents one or more words contained in a speech of a predetermined language;

said candidate correlating step correlates each of one or more speech data items of said words to one or more sets of candidate words of said predetermined language obtained by recognizing each of the one or more speech data items;

said analogous word correlating step correlates each of said candidate words correlated to each of the one or more speech data items of said words to null or more sets of analogous words of said predetermined language which may correspond to the pronunciation of each of said candidate words; and said speech data recognition step selects either said candidate word correlated to each of one or more of said speech data items of words or said analogous word correlated to each of said candidate words as a recognition result of each of one or more of speech data items of said words.

11. The recording medium of claim 10, wherein:

the speech of said predetermined language is pronounced by a speaker who mainly speaks a language other than said predetermined language;

said medium recording a program for causing a computer to execute a step of storing null or more sets of words of said predetermined language which may correspond to each of one or more speech data items of the words contained in the speech of said predetermined language in correlation to each of one or more words of said predetermined language as said analogous word of each of one or more words of said predetermined language when each of one or more words of said predetermined language is pronounced by said speaker; and said analogous word correlating step correlates null or more of said analogous words which were stored beforehand in correlation to each of one or more words of said predetermined language to each of said candidate words.

12. The recording medium of claim 11, wherein:

said candidate word correlating step associates each of said candidate words correlated to the speech data with probability data indicating a likelihood of each of said candidate word correlated to the speech data; and said speech data recognition step selects only said candidate word having a value of said probability data within a predetermined range as the result of the recognition of the speech data of said words.

13. The recording medium of claim 11, wherein:

said candidate word correlating step associates each of said candidate words correlated to the speech data with error information indicating an error of pronunciation corresponding to each of said candidate words.

14. In a speech recognition apparatus for recognizing words of a predetermined language from speech data representing one or more words of said predetermined language which are included in a speech of said predetermined language spoken by a speaker who mainly speaks a language other than the predetermined language, a recording medium recording a program for causing a computer to execute:

a word correlating step for correlating each of one or more speech data items of words of said predetermined language to at least one of one or more words of said predetermined language obtained by recognizing each of the one or more speech data items and one or more words of said predetermined language which are possibly spoken by said speaker; and a speech data recognition step for selecting one of words each correlated to each of one or more speech data items of said words as a result of recognition of each of one or more speech data items of said words.

* * * * *